(12) United States Patent
Desing et al.

(10) Patent No.: US 11,725,702 B1
(45) Date of Patent: Aug. 15, 2023

(54) AXLE DISCONNECT ASSEMBLY

(71) Applicant: JTEKT AUTOMOTIVE NORTH AMERICA, INC., Plymouth, MI (US)

(72) Inventors: Patrick Desing, Simpsonville, SC (US); Shun Ono, Novi, MI (US)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 0 days.

(21) Appl. No.: 17/709,037

(22) Filed: Mar. 30, 2022

(51) Int. Cl.
  *F16D 27/00* (2006.01)
  *F16D 27/14* (2006.01)
  *F16D 27/118* (2006.01)

(52) U.S. Cl.
  CPC .......... *F16D 27/004* (2013.01); *F16D 27/118* (2013.01); *F16D 27/14* (2013.01); *F16D 2500/10431* (2013.01); *F16D 2500/10462* (2013.01); *F16D 2500/1107* (2013.01)

(58) Field of Classification Search
  CPC ..... F16D 27/102; F16D 27/108; F16D 27/118
  See application file for complete search history.

(56) References Cited

U.S. PATENT DOCUMENTS

| | | | | |
|---|---|---|---|---|
| 84,681 | A | * | 12/1868 | Clemons ............... F16D 27/004 192/35 |
| 3,441,116 | A | * | 4/1969 | Quenneville ........... F02C 7/275 192/24 |
| 8,963,391 | B2 | * | 2/2015 | Grosskopf .............. F16D 11/04 310/78 |
| 9,022,192 | B2 | * | 5/2015 | Quehenberger ........ F16D 13/04 192/24 |
| 10,704,609 | B2 | | 7/2020 | Nakayama |
| 2009/0321153 | A1 | | 12/2009 | Boeckenhoff et al. |
| 2012/0247269 | A1 | | 10/2012 | Horie |
| 2016/0265601 | A1 | | 9/2016 | Mastie et al. |
| 2020/0114769 | A1 | | 4/2020 | Moubarak et al. |
| 2020/0122572 | A1 | | 4/2020 | Kumar et al. |

FOREIGN PATENT DOCUMENTS

| | | |
|---|---|---|
| CN | 105922852 A | 9/2016 |
| DE | 102012 101 984 A1 | 9/2013 |
| DE | 102014224198 A1 * | 6/2016 |
| DE | 10 2018 217 863 A1 | 4/2020 |
| FR | 3 071 797 B1 | 4/2019 |

* cited by examiner

*Primary Examiner* — Timothy Hannon
(74) *Attorney, Agent, or Firm* — Oblon, McClelland, Maier & Neustadt, L.L.P.

(57) ABSTRACT

An axle disconnect device including a shift collar slidable in an axial direction of the axle disconnect device, the shift collar switchable between a connect mode and a disconnect mode; a first solenoid including a threaded end; a second solenoid including locker arm; a return spring configured to bias a movement of the shift collar towards the connect mode; a groove on the shift collar configured to receive the locker arm when the shift collar is in the connect mode; and a lead screw on the shift collar configured to mesh with the threaded end to move the shift collar toward the disconnect mode against the bias force of the return spring.

7 Claims, 19 Drawing Sheets

AXLE DISCONNECT ASSEMBLY

FIELD OF THE DISCLOSURE

This disclosure relates generally to axle disconnect assembly, and more particularly, a device to disconnect electric motor axle.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

The axle disconnect function is commonly used on a secondary axle on front wheel drive vehicles or rear wheel drive vehicles, where the axle disconnect function for all wheel drive vehicle is optional. Disconnecting an electric motor driven axle of an electric vehicle may also be advantageously disconnected to maximize battery efficiency. However, the disconnecting and reconnecting of such an "e-axle" must be quick with low power consumption. Therefore, a method for a disconnect function to provide actuation between the connection and disconnection mode as quickly as possible depending on the vehicle situation is needed.

SUMMARY

An axle disconnect device according to the present disclosure may include a shift collar slidable in an axial direction of the axle disconnect device, the shift collar switchable between a connect mode and a disconnect mode; a first solenoid including a threaded end; a second solenoid including locker arm; a return spring configured to bias a movement of the shift collar towards the connect mode; a groove on the shift collar configured to receive the locker arm when the shift collar is in the connect mode; and a lead screw on the shift collar configured to mesh with the threaded end to move the shift collar toward the disconnect mode against the bias force of the return spring.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
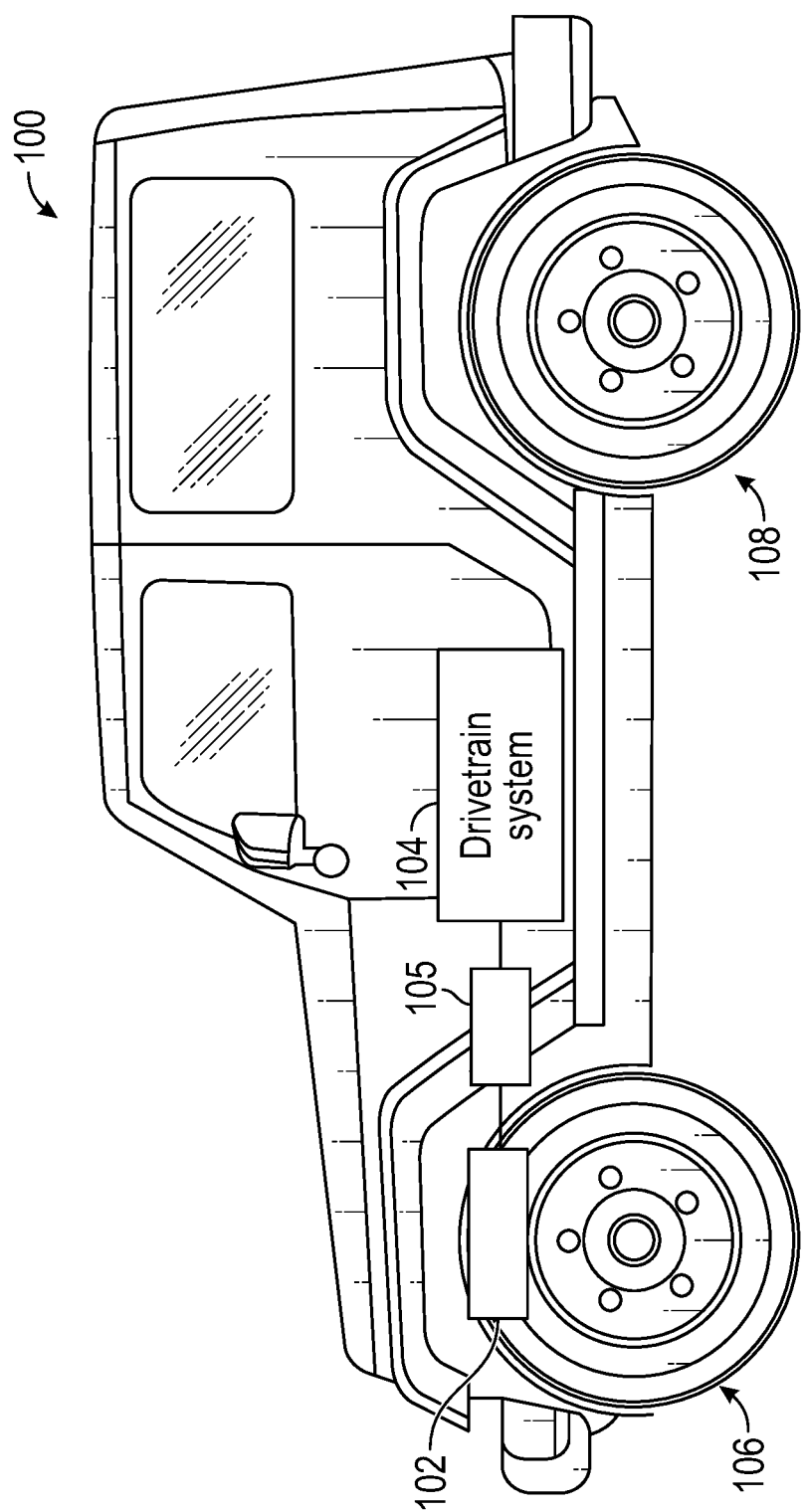
FIG. 1 is a schematic illustration of an example vehicle, in accordance with the teachings of this disclosure.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

In an embodiment, the present disclosure describes a device which is bi-stable (i.e. stable in both a connected and disconnect state) to reduce total power consumption in a powertrain system. The device may increase an expected range for electric vehicles by mechanically disconnecting an electric motor from the drive wheels. The device may disconnect the electric motor axle with an actuator with high efficiency and low power consumption. The powertrain system can be connected and disconnected with a fast response time for dynamic driving situations.

In an embodiment, the axle disconnect function is commonly used on a secondary axle on front or rear wheel drive vehicles where all wheel drive is a switchable an option. In the present disclosure, the axle disconnect function includes using an e-axle disconnecting systems where electric traction motor(s) is/are stopped in cases where all wheel drive function is not desirable. By adding the e-axle disconnecting function to this arrangement, the disconnect feature has to provide disconnect or connect actuation as quick as possible depending on the vehicle situation for maximizing traction battery efficiency. Additionally, measures must be taken to reduce the current consumption to operate the disconnect function while the system is in a shift mode, holding connect, and holding disconnect. In the present disclosure, by using a push pin operated by single solenoid and a lead screw, a quick actuation to disengage with a low current consumption is achievable. In the present disclosure, by adding a mechanical locking feature to hold the connect mode, the e-axle disconnecting system can be bi-stable without a constant solenoid current. In the present disclosure, a single solenoid and a lead screw mechanism can be used to actuate a dog sleeve with a low current consumption. The e-axle disconnecting system also includes locking grooves to be bi-stable without any current consumption. Therefore, the only current consumption required is during a state change of axle connecting and disconnecting.

FIG. 1 is a schematic illustration of an example vehicle 100 in accordance with the teachings of this disclosure. The example vehicle 100 may include a motor vehicle such as one of a car, a truck, a van, a sport utility vehicle (SUV), or the like. According to the illustrated example of FIG. 1, the vehicle 100 includes an prime mover 102 such an electric motor or internal combustion engine, an example drivetrain system 104, a controller 105, front wheels 106, and rear wheels 108. The prime mover 102 may be permanent magnet motor or an induction motor. The wheels 106, 108 may be road wheels. The example drivetrain system 104 of FIG. 1 is structured and/or configured to transfer torque from the electric motor 102 to one or both the wheels 106, 108 to cause the vehicle 100 to move, for example, via drive shafts, clutches, axles, etc., as discussed further below.

In particular, the drivetrain system 104 of FIG. 1 enables the vehicle 100 to change between a first driving mode such as a two-wheel drive that is associated with a first driving characteristic of the vehicle 100 and a second driving mode such as a four-wheel drive that is associated with a second driving characteristic of the vehicle 100 different from the first driving characteristic. For example, a controller 105 such as an electronic control unit (ECU) of the vehicle 100 transmits power and/or a control or command signal to an actuator system that is associated with the drivetrain system 104. In response, the actuator system causes an axle of the drivetrain system 104 to change between a disconnect state and a connect sate, thereby providing the respective first and second driving modes of the vehicle 100. When the vehicle 100 is operating in first driving mode, the vehicle is driven only the front wheel 106 or the rear wheel 108. However, when the vehicle 100 is operating in the second driving mode, the drivetrain system 104 transfers the output from the electric motor 102 to the other of front wheel 106 and rear wheel 108 disconnected in the first mode. The drivetrain system 104 also includes using a push pin operated by single solenoid and a lead screw, a quick actuation to disconnect with a low current consumption is achievable, which will be discussed in more detail later.

Figure 2A:
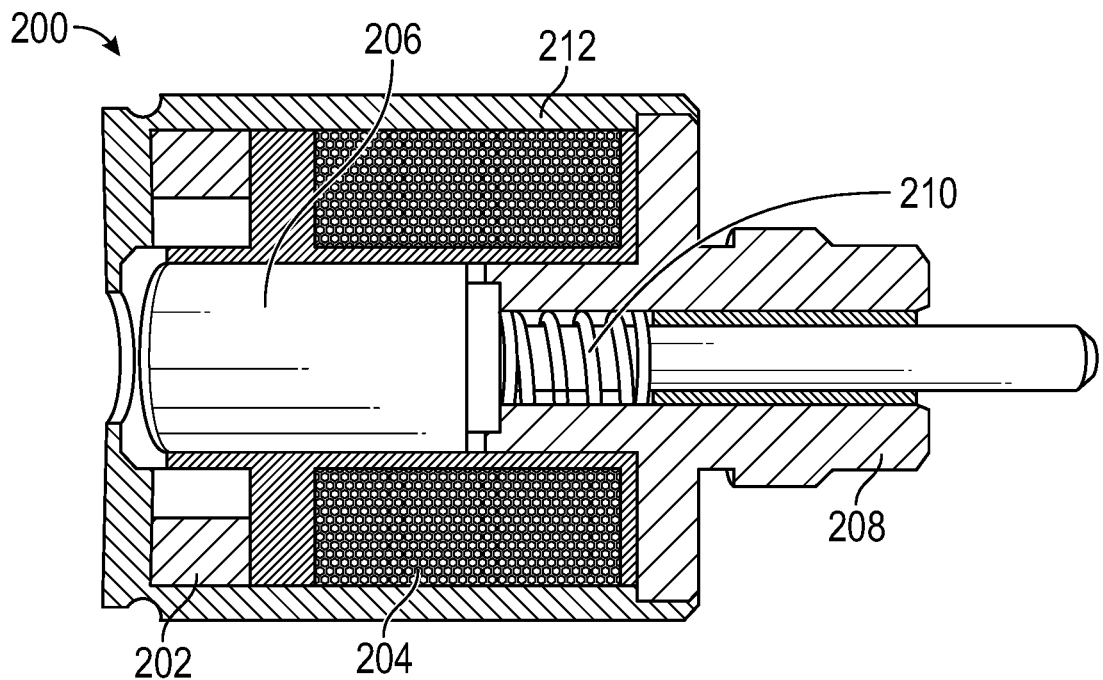
FIGS. 2A and 2B are views of an example solenoid in a latched position and a de-latched position, in accordance with the teachings of this disclosure.
Figure 2B:
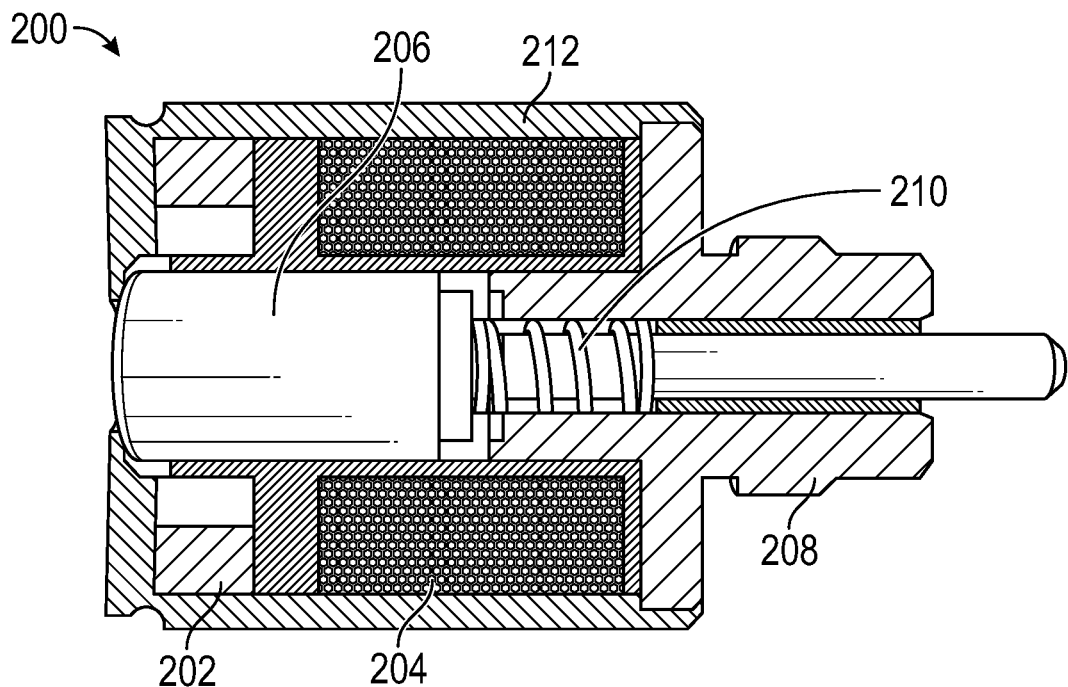

FIGS. 2A and 2B are views of an example solenoid 200 in a latched position and a de-latched position, in accordance with the teachings of this disclosure.

In FIG. 2A, a latching position of the solenoid 200 is presented. The latching solenoids 200 utilize an electrical current pulse or internal permanent magnet material 202 to maintain a set position without a constant application of an electrical current. In the present disclosure, the latching solenoids 200 with a locker arm are used for the actuation between connect and disconnect modes, which will be discussed later in FIG. 3.

While the principle of operation of a solenoid 200 in FIG. 2A is similar to linear solenoids, latching solenoids 200 are different in that the electrical polarity is important to obtain proper operation, which is useful for the present disclosure. As the current flows in one direction energizing the field of the coil 204 in the solenoids 200, it adds to the pull of the permanent magnet 202. In addition, an armature 206 is attracted to the stationary pole 208 within the body of the solenoids 200. In FIG. 2A and FIG. 2B, a spring 210 is surrounding the pole 208 and a housing 212 is a housing for the solenoid 200.

Once the armature 206 has moved full travel and is in contact with the pole 208, it may remain in this position without further electrical power input. The armature 206 is held in this position by the permanent magnet 202. To release the solenoids 200 from the hold positon to be in a de-latched position as shown in FIG. 2B, the holding magnet 200's attraction has to be cancelled by sending a current back through the field of the coil 204 in the opposite direction. A latching solenoid 200 can be used in conjunction with either of the described axle disconnect embodiments below.

Figure 3:
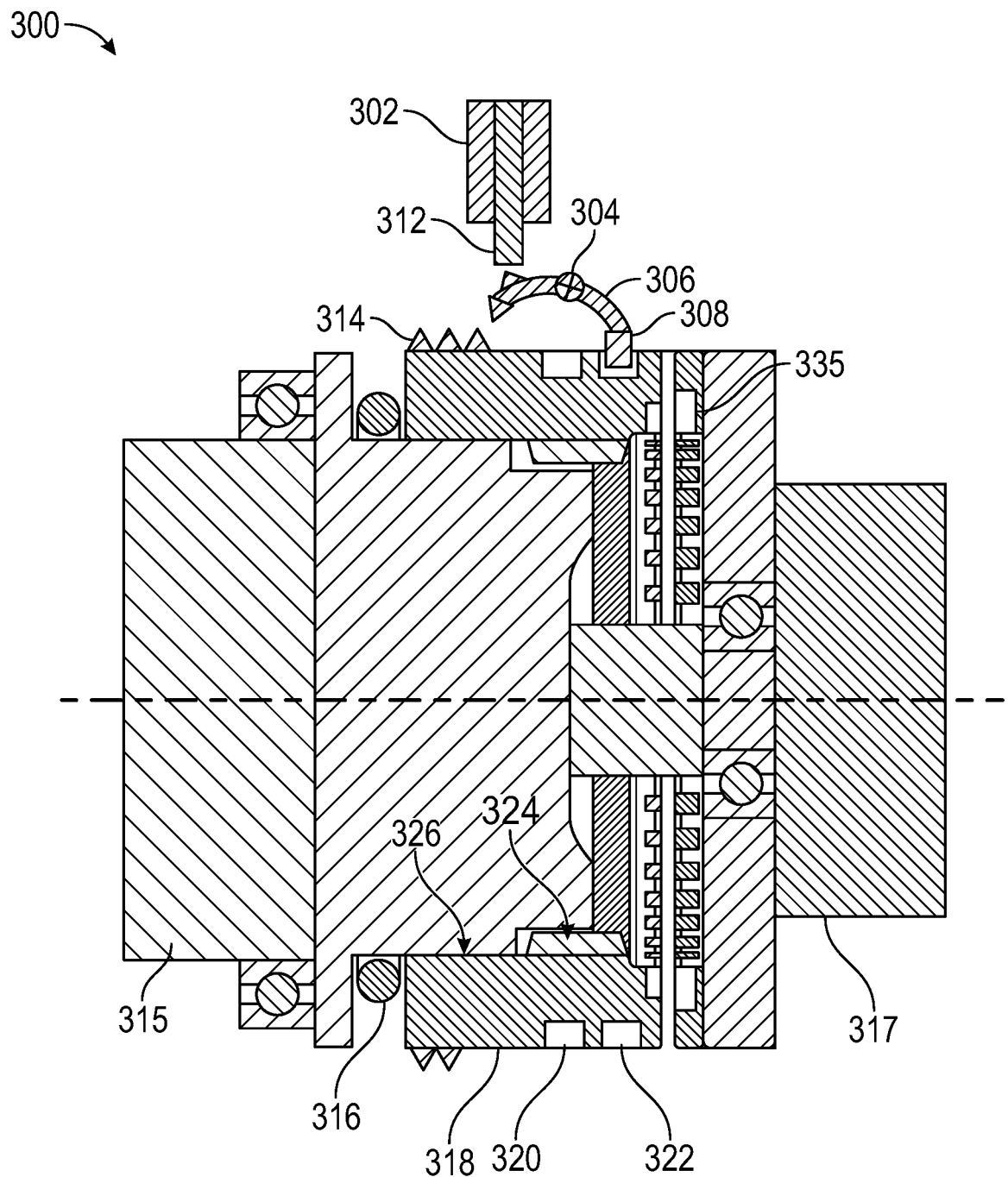
FIG. 3 is a schematic plan view of an axle disconnect assembly of a first embodiment shown in a disconnect mode, in accordance with the teachings of this disclosure.

FIG. 3 is a schematic plan view of an axle disconnect assembly of a first embodiment shown in a disconnect mode, in accordance with the teachings of this disclosure.

In FIG. 3, the axle disconnect assembly 300 of the present disclosure includes a solenoid 302, a pivot point with torsional spring 304, a locker arm 306, a claw 308, a lead screw 314, a plunger 312, a first groove 320, a second groove 322, a dog sleeve 318, a return spring 316, a pilot 326, a spline 324, an input axle shaft 317, an output shaft 315, and a face spline 310. The axle disconnect assembly 300 is adapted for use in selectively translating rotational torque between an output shaft 315 and an input axle shaft 317 of the wheel 106 or 108 in the vehicle 100 as shown in FIG. 1. As noted above, the axle disconnect assembly 300 can be used in a number of different ways and in a number of different powertrain systems. Those having ordinary skill in the art will appreciate that the output shaft 315 and/or the input shaft 317 could be of any suitable type or configuration, defined by any suitable part of either driveline the powertrain system, without departing from the scope of the present disclosure.

In FIG. 3, a plunger 312 extrudes from the solenoid 302 and may contact the locker arm 306 when the solenoid 302 has a constant current applied. A spline portion 324 and a pilot portion 326 may be located between the input shaft 317 and the output shaft 315. The spline portion 324 is connected to the input shaft 317 and the pilot portion 326 may be connected to the output shaft 315. The claw 308 may be a cube.

The operation of the axle disconnect assembly 300 starts with the pivot point with that the torsional spring 304 engages with the locker arm 306 and the claw 308 into the second groove 322 to hold the disconnect mode. The locker arm 306 being biased by the torsional spring so that claw 308 contacts the dog sleeve 318. Accordingly, with the solenoid 302 deactivated the torsional spring 304 allows to engage the locker arm 306 and the claw 308 to engage into the second groove 322 to hold the disconnect mode.

The left end of the locker arm 306 may have a triangular tip, which can be used to connect to the lead screw 314 in a connect mode, which will be discussed later in FIG. 4. The locker arm 306 may have an extruding portion on top of the triangular tip, that is configured to receive a force from the plunger 312. The extruding portion may contact the plunger 312 when the solenoid 302 moves down, which will also be discussed later.

In the embodiment, the claw 308 stays in the second groove 322 when it is in the disconnect mode due to the bias force of the torsional spring 304. Furthermore, the claw 308 may stay in the first groove 320 when it is in a connect mode due to the bias force of the torsional spring 304. The size of the first groove 320 and the second groove 322 may be larger than the size of the claw 308, so that the claw 308 may stay in the first groove 320 and the second groove 322 in different modes. When the claw 308 is held in the first groove 320 the dog sleeve 318 is unable to move toward and engage with output shaft side spline].

Lead screws 314 may be toothed, so that the triangular tip of the locker arm 306 may be connected to the lead screws 314 when the axle disconnect assembly 300 is in a connect mode. The lead screw 314 may be located on top of the dog sleeve 318. The first groove 320 and the second groove 322 may also be on top of the dog sleeve 318.

A return spring 316 may be located on the left side of the dog sleeve 318. The return spring 316 may be used to thrust the dog sleeve 318 to the input shaft 317 and the face spline 335 may connect to the input shaft 317 when the axle disconnect assembly 300 is in a connect mode.

Figure 4:
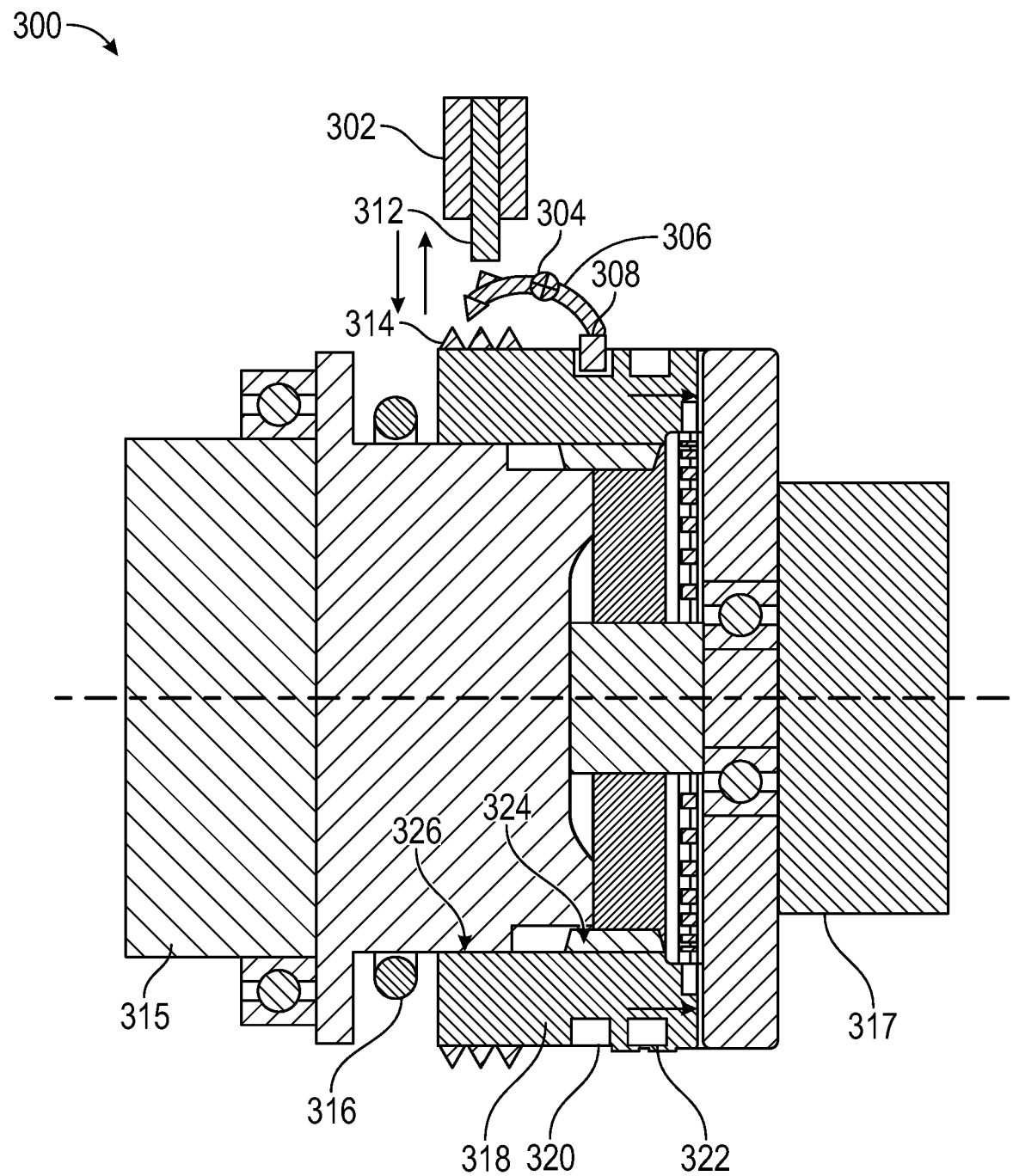
FIG. 4 is a schematic plan view of an axle disconnect assembly of a first embodiment shown in a connect mode, in accordance with the teachings of this disclosure.

FIG. 4 is a schematic plan view of an axle disconnect assembly of a first embodiment shown in a connect mode, in accordance with the teachings of this disclosure.

The solenoid 302 is actuated momentarily. Due to the momentarily current in the solenoid 302, the plunger 312 may push and pull the locker arm 306 momentarily, and the locker arm 306 may then be rotated. The claw 308 may then be released from the second groove 322. After the claw being released from the second groove 302, the return spring 316 thrusts the dog sleeve 318 towards the input shaft 317. Furthermore, after the dog sleeve 318 moving towards the input shaft 317, the torsional spring 304 engages the locker arm 306 and the claw 308 into the first groove 320 to hold the connect mode.

Figure 5:
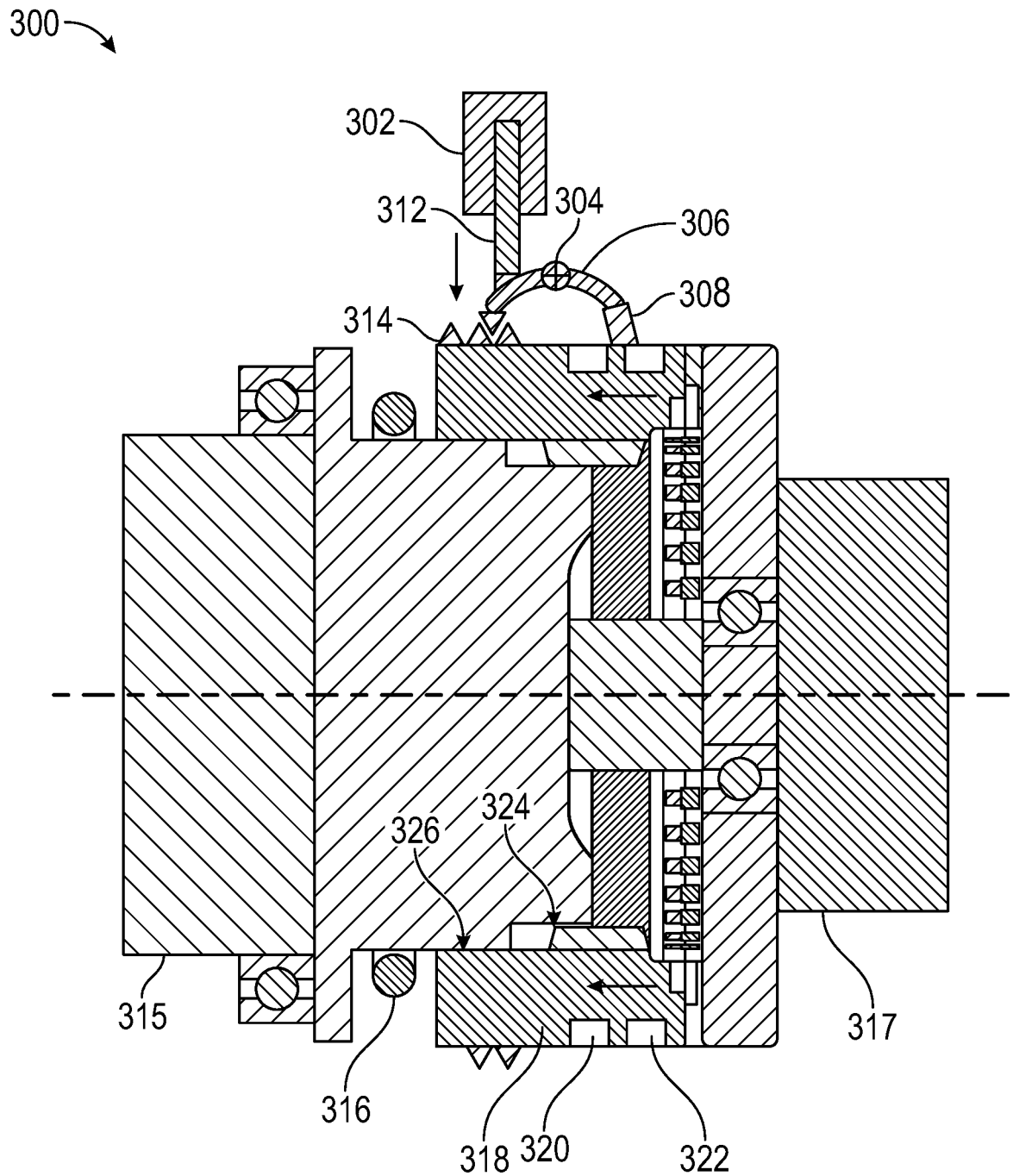
FIG. 5 is a schematic plan view of an axle disconnect assembly of a first embodiment shown in a screw winding mode, in accordance with the teachings of this disclosure.

FIG. 5 is a schematic plan view of an axle disconnect assembly of a first embodiment shown in a screw winding mode, in accordance with the teachings of this disclosure.

The solenoid 302 is actuated with a constant current, therefore the plunger 312 moves down to contact the extruding portion of the locker arm 306. The thrust force from the plunger 312 causes the triangular tip on the left end of the locker arm 306 to connect with the lead screw 314. The thrust force from the plunger 312 also causes the locker arm 306 to disengage the claw 308 from the first groove 320. The triangular tip of the locker arm engaging with the lead screw 314 causes the dog sleeve 318 to move away from the input shaft 317. Accordingly, the face spline 335 disconnects and the axle disconnect assembly 300 changes the disconnect mode.

Therefore, the locker arm 306 engaging in the grooves 320 and 322 create a bi-stable disconnect and connect mode in which the face spline 335 is respectively disengaged and engaged. Further, these modes can be achieved without constant current in the solenoid 302. Rather, the solenoid 302 is also only energized to disengage the locker arm 306 from the groove 322 to effect the connect mode, and to disengage the locker arm 306 from the groove 320 and engage the lead screw 314 to effect the disconnect mode.

Figure 6:
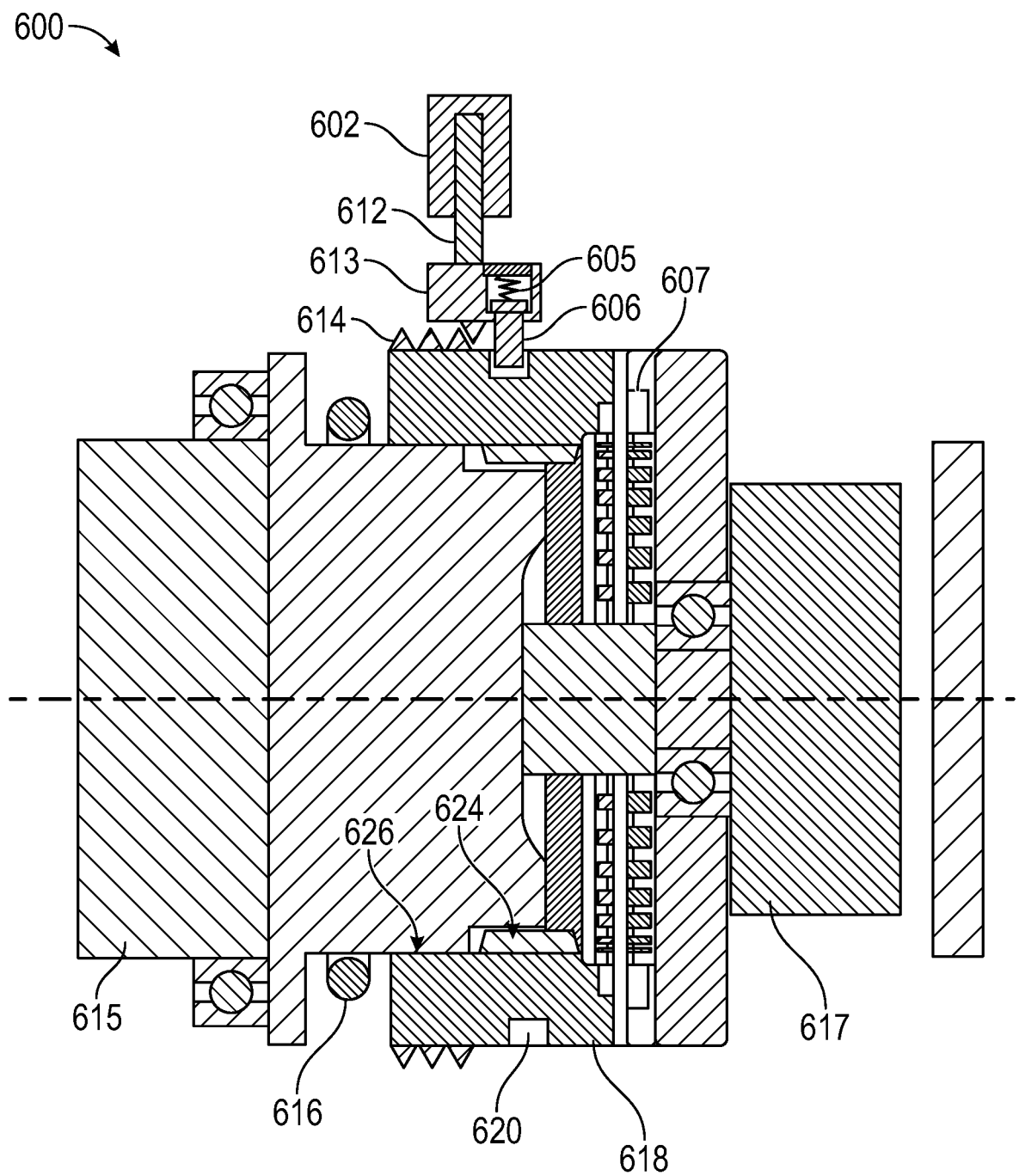
FIG. 6 is a schematic plan view of an axle disconnect assembly of a second embodiment shown in a disconnect mode, in accordance with the teachings of this disclosure.

FIG. 6 is a schematic plan view of an axle disconnect assembly of a second embodiment shown in a disconnect mode, in accordance with the teachings of this disclosure.

In FIG. 6, the axle disconnect assembly 600 of the present disclosure includes a solenoid 602, a pivot point with torsional spring 604, a locker pin 606, a spring 605, a plunger head 613, a plunger 612, a lead screw 614, a groove 620, a dog sleeve 618, a return spring 616, a pilot portion 626, a spline 624, an input axle shaft 617, an output shaft 615, and a face spline 607. Here, the solenoid 602 is a latching solenoid as similar to latching solenoid 200 described in FIG. 2A and FIG. 2B.

As described earlier, the axle disconnect assembly 600 is adapted for use in selectively translating rotational torque between the output shaft 615 and the input axle shaft 617 of the wheel 106 or 108 in the vehicle 100 as shown in FIG. 1. As noted above, the axle disconnect assembly 600 can be used in a number of different ways and in a number of different powertrain systems. Those having ordinary skill in the art will appreciate that the output shaft 615 and/or the input shaft 617 could be of any suitable type or configuration, defined by any suitable part of either driveline the powertrain system, without departing from the scope of the present disclosure.

In FIG. 6, the plunger 612 extrudes from the solenoid 602 and may have a plunger head 613 including the spring 605. A spline portion 624 and a pilot portion 626 may be located between the input shaft 617 and the output shaft 615. The spline portion 624 may be closer to the input shaft 617 and the pilot portion 626 may be connected to the output shaft 615.

The operation of the axle disconnect assembly 600 starts with the locker pin 606 located on the bottom of the plunger head 613 and the locker pin 606 engages with the groove 620 to hold the disconnect mode. Here, the solenoid 602 is deactivated and latched in an extended state to allow the locker pin 606 of the plunger 612 to engage with the groove 620 to hold the disconnect mode.

The bottom of the plunger head 613 may have a triangular tip, which can be used to engage with the lead screw 614, which will be discussed later. The locker pin 606 may contact the groove 620 when the solenoid 602 moves down, which will also be discussed later.

The width of the locker pin 606 may be slightly smaller than the groove 620, so that the locker pin 606 may fit into the groove 620 in different modes such as the connect mode and the disconnect mode.

The lead screws 614 may be toothed, so that the triangular tip of the plunger head 613 may be connected to the lead screws 614 when the axle disconnect assembly 600 is in a connect mode. The lead screw 614 may be located on top of the dog sleeve 618. The groove 620 may also be on top of the dog sleeve 618.

In the connect mode, the solenoid 602 is momentarily energized so that the plunger 612 is retracted. Therefore, the locker pin 606 is removed from the groove 620. The solenoid 602 may then be latched in the retracted state.

A return spring 616 may be located on the left side of the dog sleeve 618. With the locker pin 606 removed from groove 620, the return spring 616 may be used to thrust the dog sleeve 618 toward the input shaft 617 and the face spline 607 may connect to the input shaft 617 to the output shaft 615.

Figure 7:
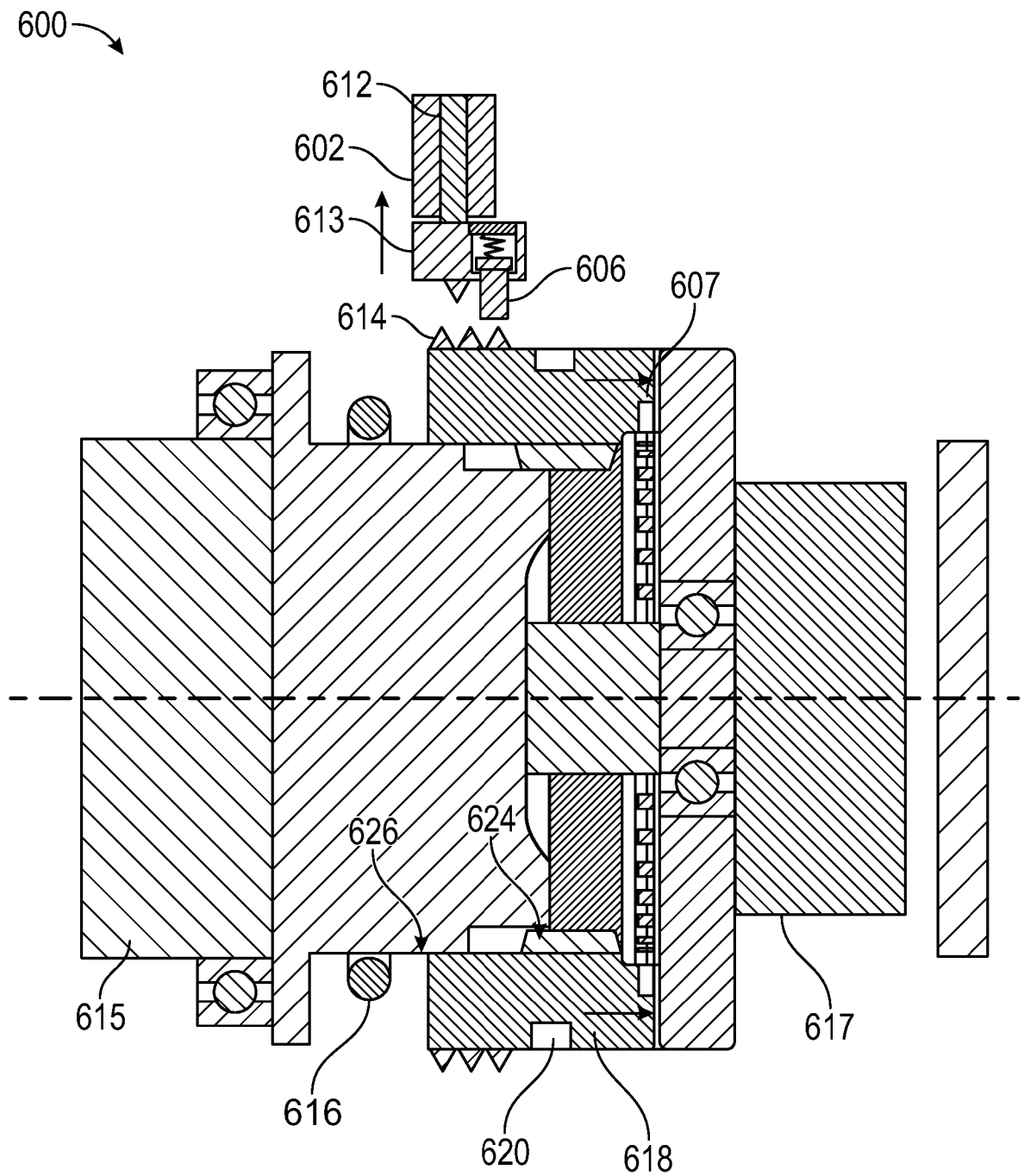
FIG. 7 is a schematic plan view of an axle disconnect assembly of a second embodiment shown in a connect mode, in accordance with the teachings of this disclosure.

FIG. 7 is a schematic plan view of an axle disconnect assembly of a second embodiment shown in a connect mode, in accordance with the teachings of this disclosure.

The solenoid 602 is actuated momentarily, so that the plunger head 613 moves up with the solenoid 602, and further the locker pin 606 is disengaged from the groove 620. The solenoid 602 may be held in the latched state by a permanent magnet which is installed in the body of the solenoid 602.

The return spring 616 may further thrust the dog sleeve 618 towards the input shaft 617 to connect to the face spline 607 after the disengagement of the locker pin 606 from the groove 620, which represents a connect mode of the axle disconnect assembly 600.

Figure 8:
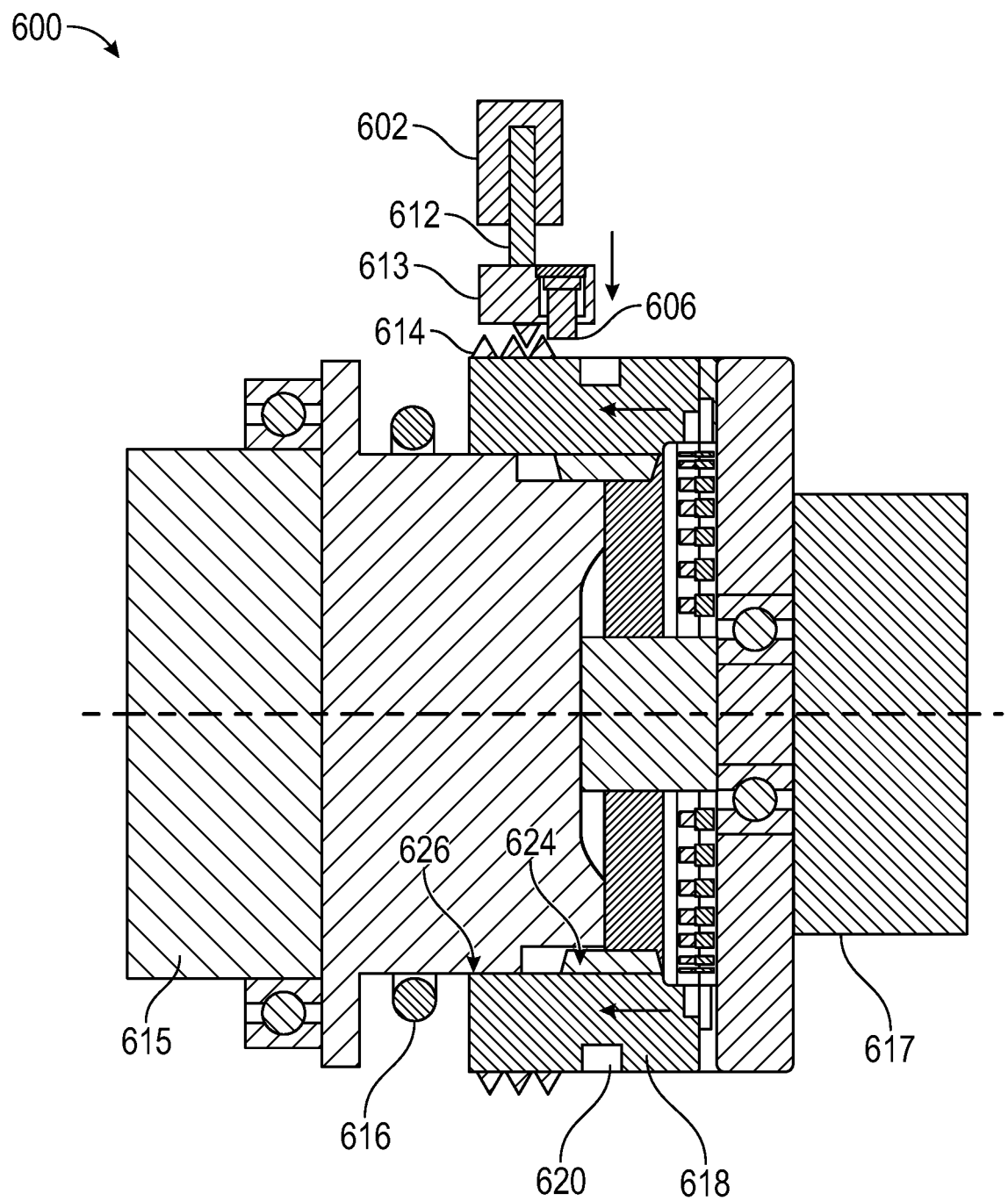
FIG. 8 is a schematic plan view of an axle disconnect assembly of a first embodiment shown in a screw winding mode, in accordance with the teachings of this disclosure.

FIG. 8 is a schematic plan view of an axle disconnect assembly of a second embodiment shown in a screw winding mode, in accordance with the teachings of this disclosure.

The solenoid 602 is de-latched by a momentary reverse current and the plunger 612 is extended. The tooth (tip) of the plunger head 613 engages with the lead screw 614. The lead screw 614 then moves the dog sleeve 618 away from the input shaft 617 to disconnect the face spline 607. As the dog sleeve 618 moves due to the lead screw 614, the locker pin 606 aligns and engages with the groove 620 due to bias of spring 605. At this point, the axle disconnect assembly is locked in the disconnect mode (see FIG. 6).

Figure 9:
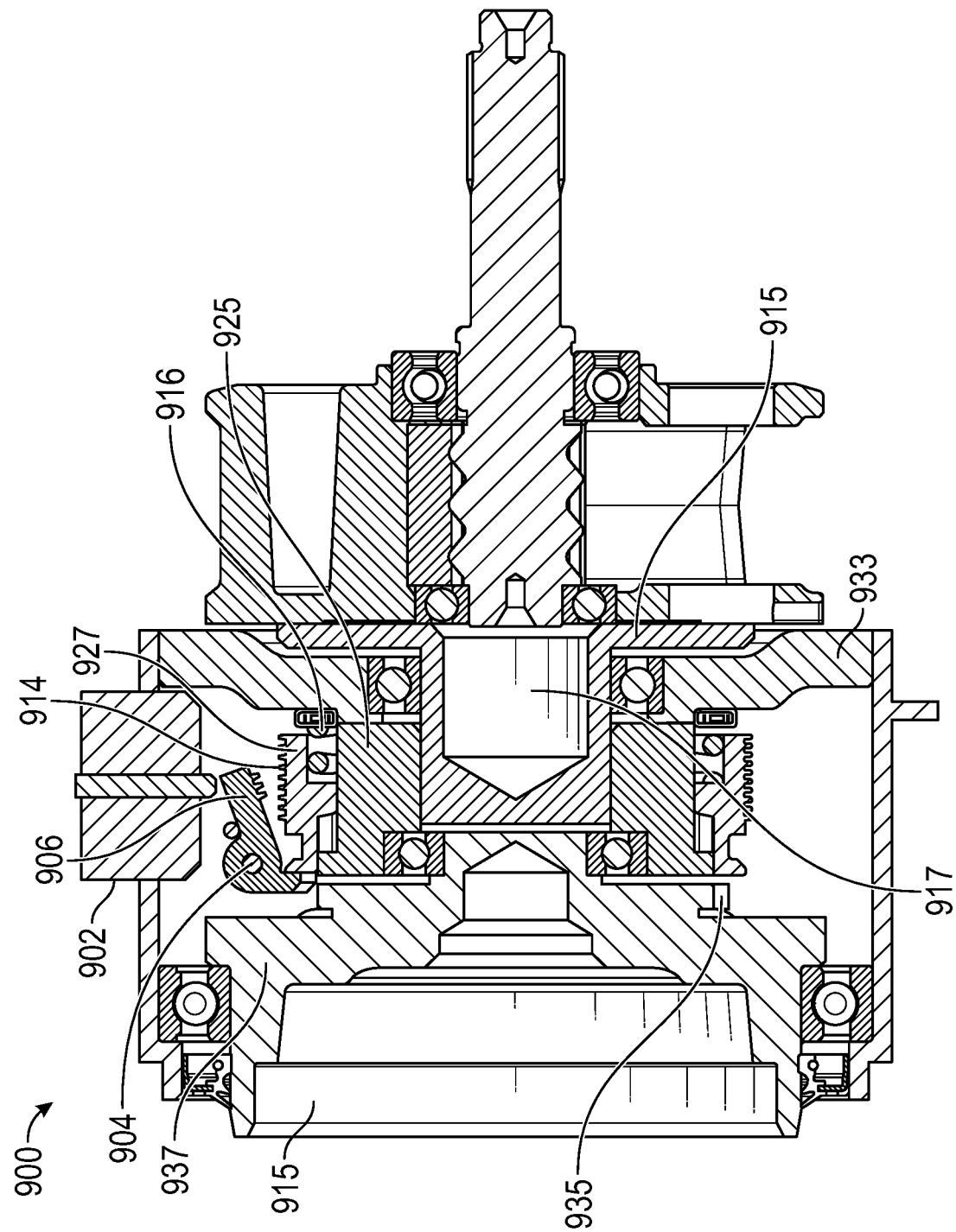
FIG. 9 is a schematic plan view of an axle disconnect assembly of a third embodiment, in accordance with the teachings of this disclosure.

FIG. 9 is a schematic plan view of an axle disconnect assembly of a third embodiment, in accordance with the teachings of this disclosure.

In FIG. 9, an overview of the axle disconnect assembly 900 is shown. The axle disconnect assembly 900 includes a solenoid 902, a pivot point with a torsional spring 904, a locker arm 906, a lead screw 914, a return spring 916, an intermediate shaft 925, a shift collar 927, a stopper 929, a support housing 933, shift spline 935, an output shaft 915, and an input shaft 917.

The solenoid 902 is located on top of the pivot point with the torsional spring 904, the locker arm 906, the intermediate shaft 925, and the shift collar 927. The solenoid 902 may connect or disconnect to the locker arm 906 depending on the connected mode or the disconnected mode, which will be discussed later in FIG. 10 and FIG. 11. The shift collar 927 is normally connected to a carrier and the output shaft 915 is mated to the carrier. The support housing 933 may be located around the input shaft 917 and support a bearing. The return spring 916 may be adjacent to the shift collar 927 and the lead screw 914 and the return spring 916 may be used disengage the shift collar 927 which will be described later.

Figure 10:
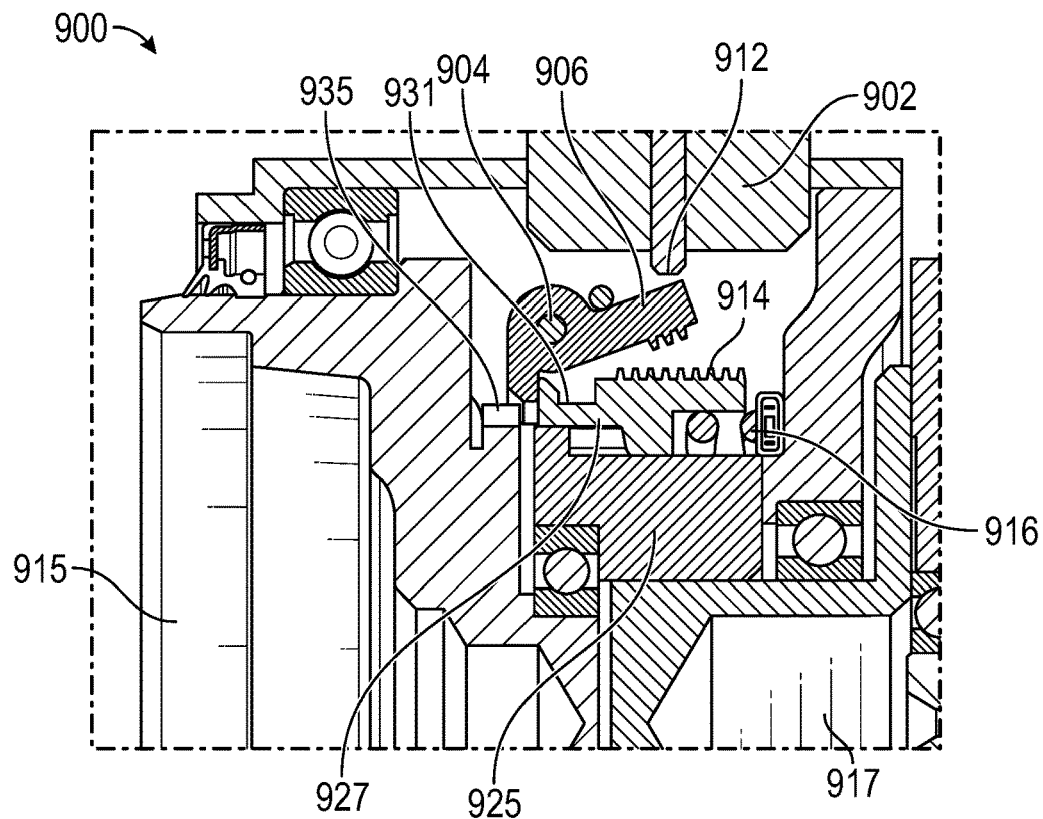
FIG. 10 is a schematic plan view of an axle disconnect assembly of the third embodiment shown in a disconnect mode, in accordance with the teachings of this disclosure.

FIG. 10 is a schematic plan view of an axle disconnect assembly of the third embodiment shown in a disconnect mode, in accordance with the teachings of this disclosure.

In FIG. 10, the axle disconnect assembly 900 of the present disclosure includes a solenoid 902, a pivot point with torsional spring 904, a locker arm 906, a lead screw 914, a plunger 912, a groove 931, an intermediate shaft 925, a shift collar 927, a return spring 916, an input shaft 917, and an output shaft 915. The axle disconnect assembly 900 is adapted for use in selectively translating rotational torque between an output shaft 915 and an input axle shaft 917 of the wheel 106 or 108 in the vehicle 100 as shown in FIG. 1. As noted above, the axle disconnect assembly 900 can be used in a number of different ways and in a number of different powertrain systems. Those having ordinary skill in the art will appreciate that the output shaft 915 and/or the input shaft 917 could be of any suitable type or configuration, defined by any suitable part of either driveline the powertrain system, without departing from the scope of the present disclosure. In FIG. 10, a plunger 912 extrudes from the solenoid 902 and may contact the locker arm 906 when the solenoid 902 has a constant current.

The operation of the axle disconnect assembly 900 starts with the pivot point with that the torsional spring 904 disengages with the locker arm 906 from the groove 931 to hold the disconnect mode. For example, the solenoid 902 is deactivated to allow the torsional spring 904 to disengage the locker arm 906 from the groove 931 to hold the disconnect mode. Here, the left end of the locker arm 906 includes a locking pin that abuts against a left end side of the shift collar 927 to prevent axial movement of the shift collar 927. The locking pin of the locker arm 906 locking the shift collar 927 in place.

The right end of the locker arm 906 may be toothed, which can be used to connect to the lead screw 914, which will be discussed later in FIG. 11. The locker arm 906 also includes the locking pin on the left end of the locker arm 906, which will connect to the groove 931 later in a connect mode.

A return spring 916 may be located on the right side of the intermediate shaft 925. The return spring 916 may be used to thrust the shift collar 927 toward the output shaft 915 when the axle disconnect assembly 900 is in a connect mode, which will be discussed later.

Figure 11:
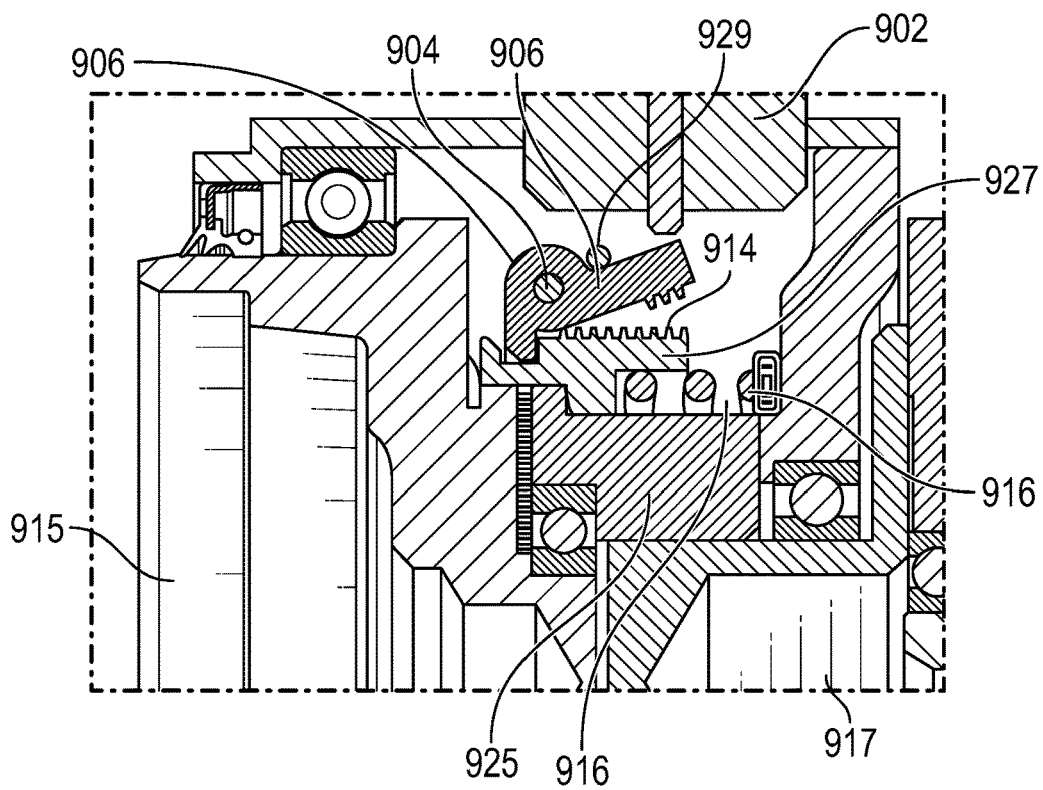
FIG. 11 is a schematic plan view of an axle disconnect assembly of the third embodiment shown in a connect mode, in accordance with the teachings of this disclosure.

FIG. 11 is a schematic plan view of an axle disconnect assembly of the third embodiment shown in a connect mode, in accordance with the teachings of this disclosure.

The solenoid 902 is actuated momentarily to rotate the locker arm 906 and rotate the locking pin of the locker arm 906 away from the end of the shift collar 927. The stopper 929 prevents over rotation of the locker arm 906. With the locker arm 906 released, the return spring 916 thrusts the shift collar 927 towards the output shaft 915. The shift collar 927 then engages with the shift spline 935 on the output shaft housing 937. (FIG. 11 connect mode) Accordingly, the input shaft 917 is connected to the output shaft 915 via the shift collar 927.

After the locking pin releases the end of the shift collar 927, the solenoid 902 is de-energized. Therefore, the torsional spring 904 biases the locking pin of the locker arm 906 downward and engages the groove 931. The engagement of the locking pin in the groove 931 in combination with the return spring 916 maintains the connect mode of the axle disconnect assembly 900 without constant current of the solenoid 902.

Figure 12:
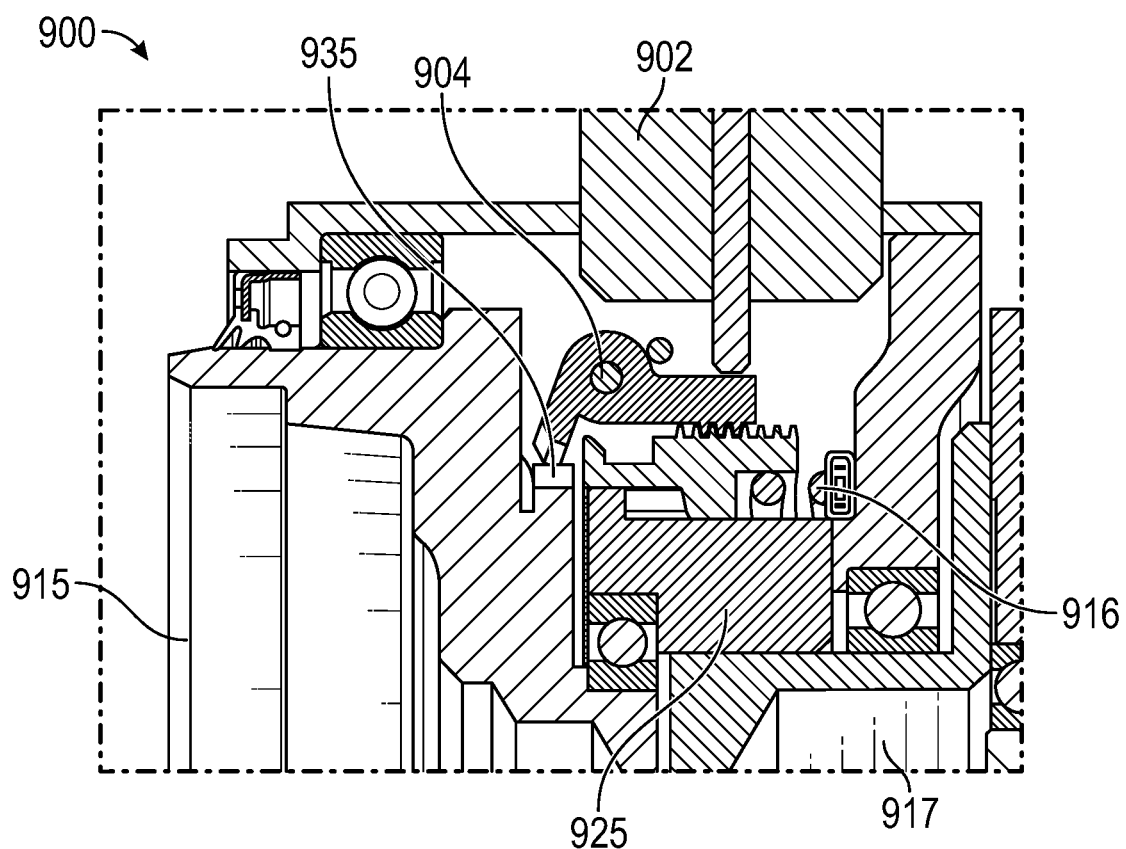
FIG. 12 is a schematic plan view of an axle disconnect assembly of the third embodiment shown in a screw winding mode, in accordance with the teachings of this disclosure.

FIG. 12 is a schematic plan view of an axle disconnect assembly of the third embodiment shown in a screw winding mode, in accordance with the teachings of this disclosure.

The solenoid 902 is de-latched by a reverse current. The plunger 912 of the solenoid 902 extends and contacts the locker arm 906. The threaded portion of the locker arm 906 is held in contact with the lead screw 914. Further, the locking pin is disengaged from the groove 931. With the threaded portion engaged with the lead screw 914, the shift collar 927 is moved toward the input shaft 917 against the bias force of return spring 916. As the shift collar 927 moves, the end of the shift collar disengages with the shift spline 935 of the output shaft 915. Accordingly, the output shaft 915 and the input shaft are in the disconnect mode. The solenoid 902 is de-energized at a point when the locking pin has past the end of the shift collar 927. The bias force of the torsional spring 904 pushes the locking pin downward against the end of the shift collar 927. Then, the axle disconnect assembly is locked in the disconnect mode (see FIG. 10).

A transition between the connect mode and the disconnect mode, will now be explained. In FIG. 11, the axle disconnect assembly 900 is in a connect mode. The left end of the shift collar 927 engages with the shift spline 935 to connect the output shaft 915 and the input shaft 917. The left end of the locker arm 906 (locking pin) is held in the groove 931 of the shift collar 927. The torsional spring 904 pushes the locker arm 906 downward (counter clockwise direction in FIG. 11) so the left end of the locker arm 906 stays in the groove 931 in the connect mode. Therefore, the torsional spring 904 is used to hold the locker arm 906 and the shift collar 927 in the connect mode.

In FIG. 12, a transition from the connect mode to the disconnect mode is shown. The solenoid 902 is energized and the plunger 912 moves down to thrust the right end of the locker arm 906 downward, so the thread of the locker arm 906 engages with the thread on the right end of the shift collar 927. This movement frees the end of the shift collar 927 from the locking pin of the locker arm 906. Further, the engaged threads of the locker arm 906 and the shift collar 927 move the shift collar 927 toward the input shaft 917. (Rightward in FIG. 12.) This disengages the left end of the shift collar 927 from the shift spline 935 of the output shaft housing 937.

In FIG. 10, the solenoid 902 is de-energized when the shift collar 927 has moved sufficiently rightward to disengage with the shift spline 935 of the output shaft housing 937. The right end of the locker arm 906 moves up due to the bias force of the torsional spring 904. Accordingly, the thread of the locker arm 906 disengages with the thread on the right end of the shift collar 927. Further, the locking pin of the locker arm 906 contacts the left end of the shift collar 927 to maintain the disconnect mode.

Figure 13:
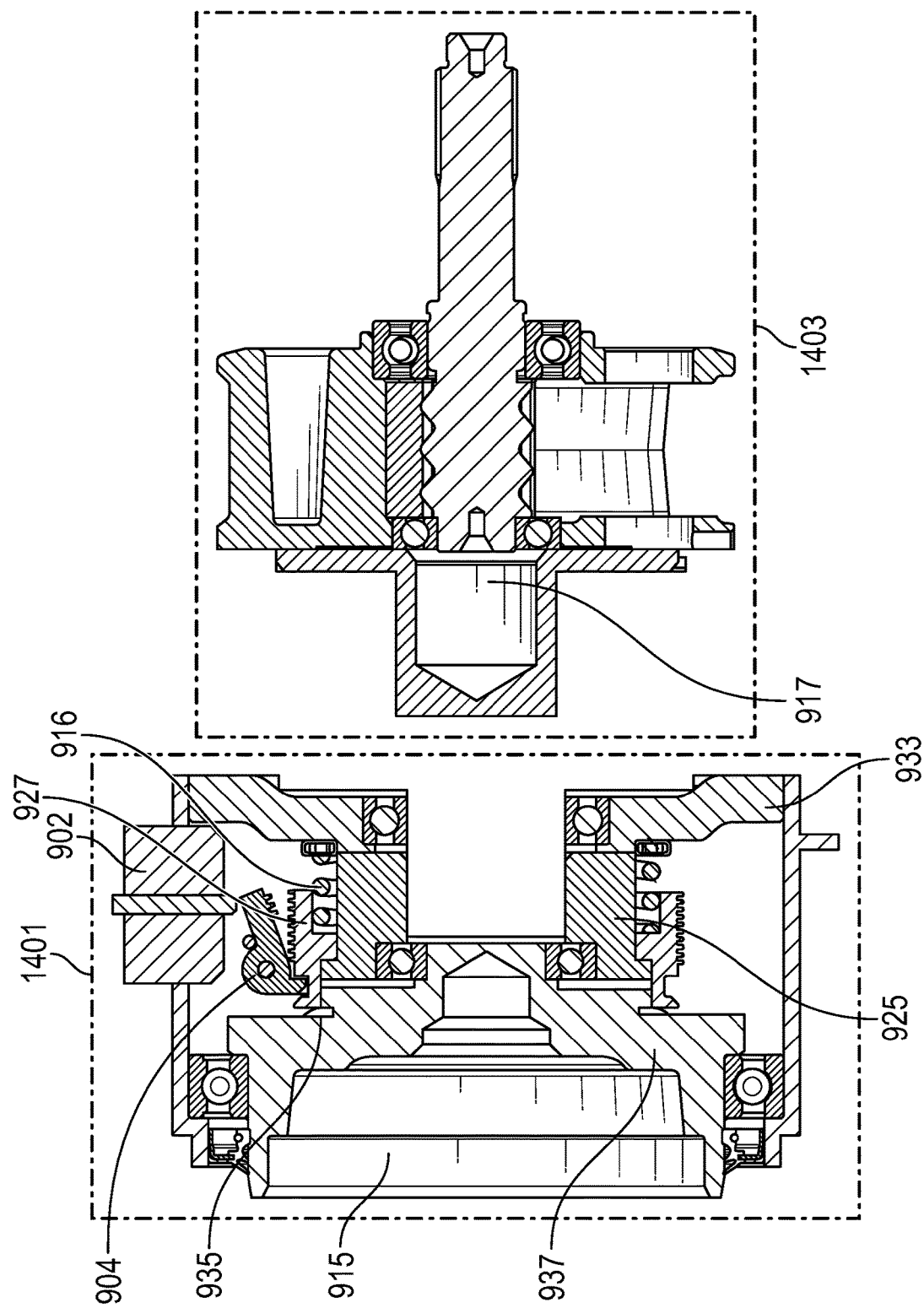
FIG. 13 is a schematic plan view of an axle disconnect assembly of the third embodiment showing a packaging structure of a first sub-assembly connecting to a second sub-assembly, in accordance with the teachings of this disclosure.

FIG. 13 is a schematic plan view of an axle disconnect assembly of the third embodiment showing a packaging structure of a first sub-assembly connecting to a second sub-assembly, in accordance with the teachings of this disclosure.

The first sub-assembly 1401 includes, but is not limited to, the solenoid 902, the locker arm 904, the output shaft 915, the intermediate shaft 925, the return spring 916, the shift collar 927, and bearing support 933. The second sub-assembly 1403 includes, but is not limited to, the input shaft 917 on the left end of the sub-assembly 1403.

The input shaft 917 of the second sub-assembly 1403 may be connected to the right end of the output shaft 915 of the first sub-assembly 1401 in a packaging process to form the axle disconnect assembly 900 discussed earlier in FIG. 9. The diameter of the input shaft 917 of the second sub-assembly 1403 may be similar to the diameter of the output shaft 915.

Figure 14:
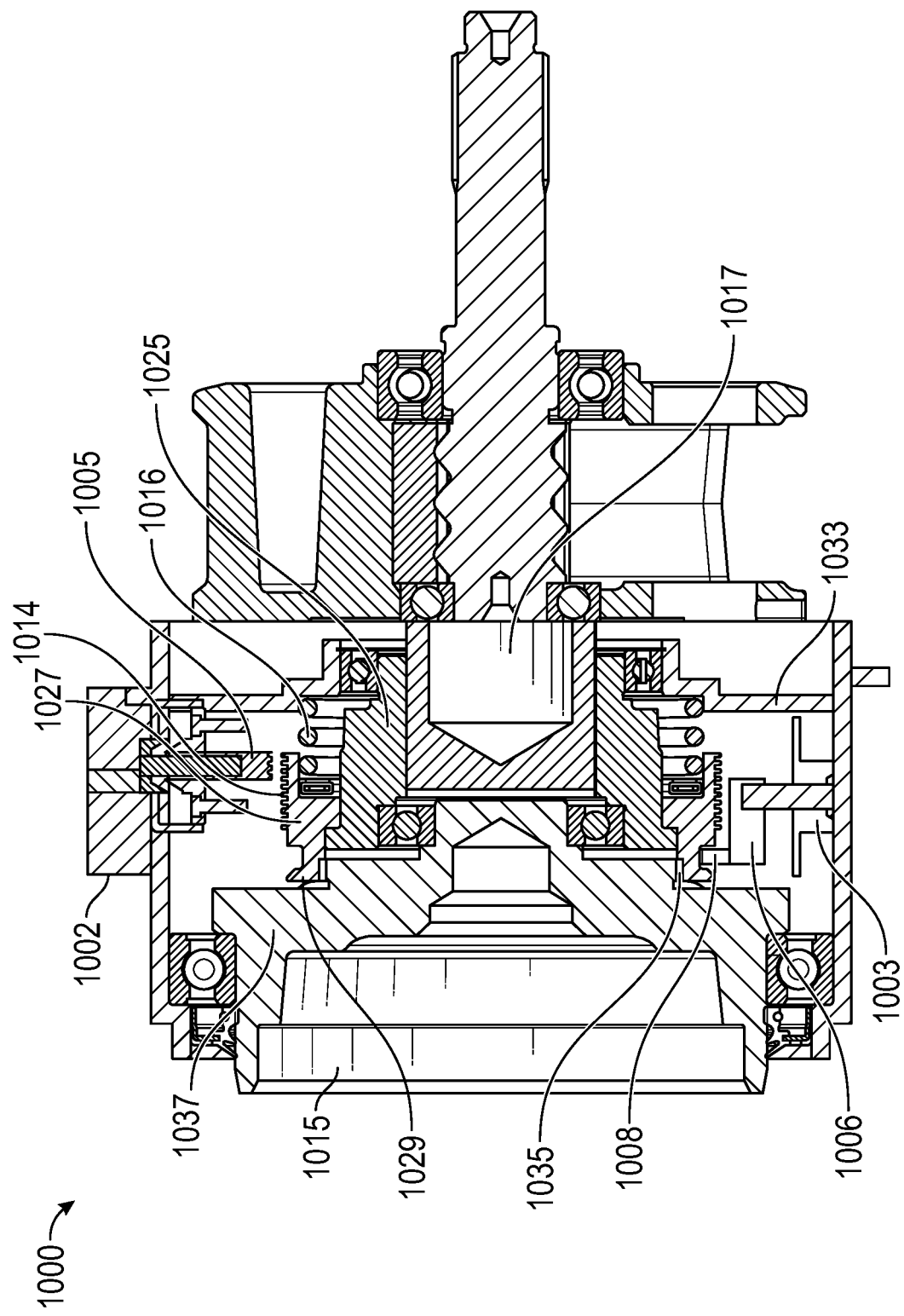
FIG. 14 is a schematic plan view of an axle disconnect assembly of a fourth embodiment, in accordance with the teachings of this disclosure.
Figure 15:
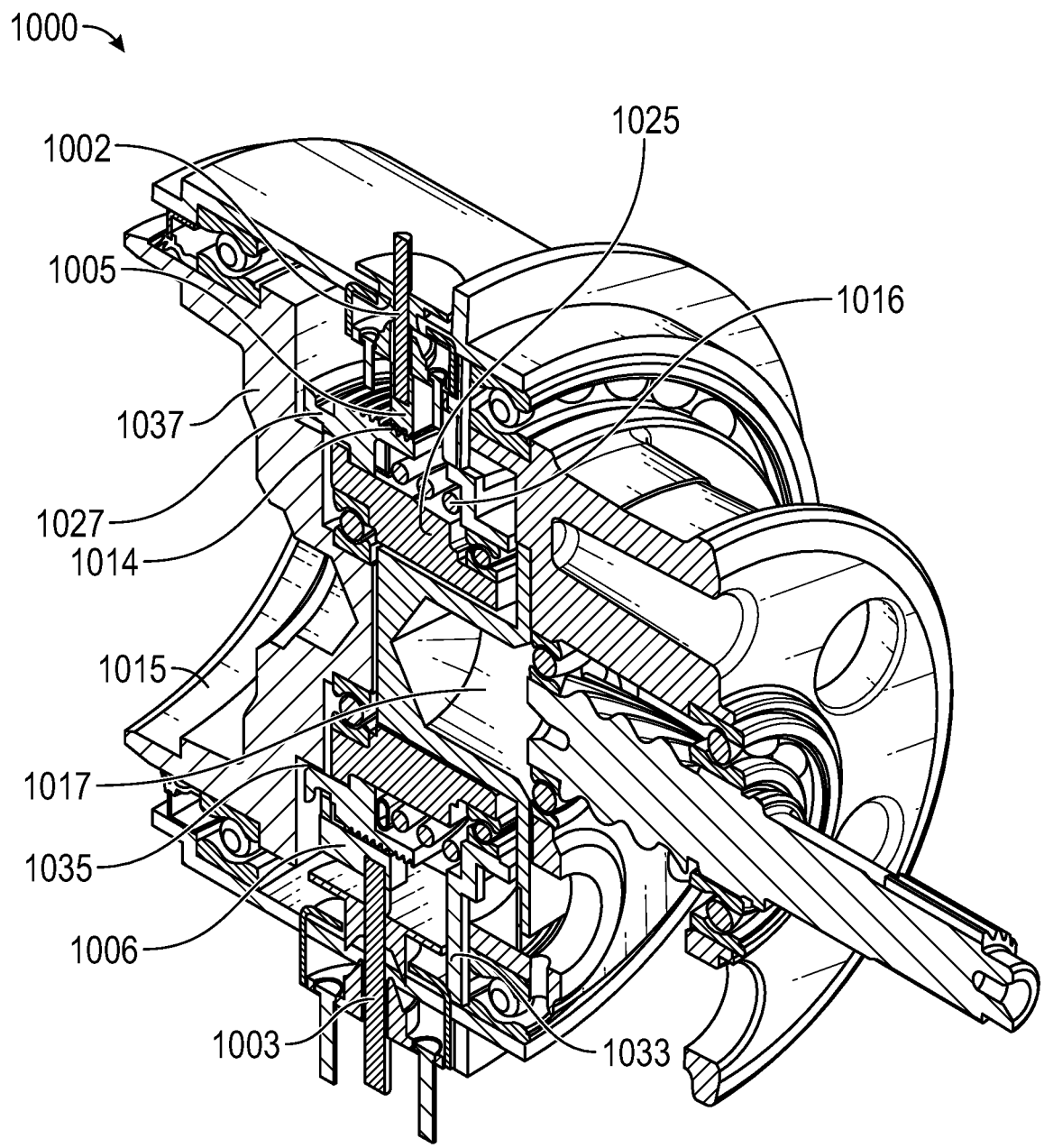
FIG. 15 is an isometric view of an axle disconnect assembly of a fourth embodiment, in accordance with the teachings of this disclosure.

FIG. 14 is a schematic plan view of an axle disconnect assembly of a fourth embodiment, in accordance with the teachings of this disclosure. FIG. 15 is an isometric view of the same axle disconnect assembly of the fourth embodiment.

In FIGS. 14-15, an overview of the axle disconnect assembly 1000 is shown. The axle disconnect assembly 1000 includes a solenoid 1002, a solenoid 1003, a threaded tip 1005, a locker arm 1006, a tip 1008 of locker arm 1006, a lead screw 1014, a return spring 1016, an intermediate shaft 1025, a shift collar 1027, a bearing support housing 1033, shift spline 1035, an output shaft housing 1037, an output shaft 1015, and an input shaft 1017.

The solenoid 1002 is located at the top of the axle disconnect assembly and operable to extend a solenoid plunger (piston) downward in FIG. 14. The plunger of solenoid 1002 is retracted when de-energized and extends when energized. A spring or the like internal to the solenoid 1002 biases the plunger upwards in FIG. 14. A distal, threaded tip 1005 is formed an end of the plunger of solenoid 1002. The threaded tip 1005 is arranged to mesh with the lead screw 1014 of the shift collar 1027 when the solenoid is energized. The shift collar 1027 is connected (splined) to the intermediate shaft 1025. The shift collar 1027 is slidable along the intermediate shaft 1025 towards and away from the output shaft 1015. This action will be explained further with regard to FIGS. 17-19. The support housing 1033 may be located around the input shaft 1017 and support a bearing. The return spring 1016 may be adjacent to the shift collar 1027 and bias the shift collar toward the output shaft 1015 relative to the intermediate shaft 1025.

An output shaft housing 1037 interfaces with and supports an end of the output shaft 1015. The output shaft housing 1037 is supported by at least one bearing to be relatively rotatable with regards to the input shaft 1017 and the intermediate shaft 1025. The output shaft housing 1037 includes a shift spline 1035 on an outer circumferential surface closest to the shift collar 1027. The shift spline 1035 is arranged to mesh with an end 1029 of the shift collar 1027 when the shift collar 1027 is extended toward the output shaft 1015. When the shift spline 1035 and the shift collar 1027 are in mesh, the output shaft 1015 and the intermediate shaft 1025 rotate together. The intermediate shaft 1025 and the input shaft 1017 are connected (splined) so as to rotate together. Therefore, when the shift collar 1027 is in mesh with the shift spline 1035, the input shaft 1017 and the output shaft 1015 are connected.

The second solenoid 1003 is arranged on the bottom of the axle disconnect assembly 1000 as illustrated in FIGS. 14-15. The solenoid 1003 arranged to have the plunger extended when de-energized (upward in FIG. 14) and to retract (downward in FIG. 14) when energized. An end of the plunger of the solenoid 1003 is connected to locker arm 1006 which extends in the axial direction, radially outside of the lead screw 1014. A tip 1008 of the locker arm 1006 extends upward in FIG. 14. The tip 1008 engages with the shift collar 1027 in two positions. In a first position, the tip 1008 engages with the end 1029 of the shift collar 1027 that meshes with the shift spline 1035. (FIG. 19) In a second position, the tip 1008 engages with a groove 1031 that is on an outer circumferential surface of the shift collar 1027. (FIG. 17) The groove 1031 is arranged in the axial direction between the end 1029 and the lead screw 1014.

Figure 16:
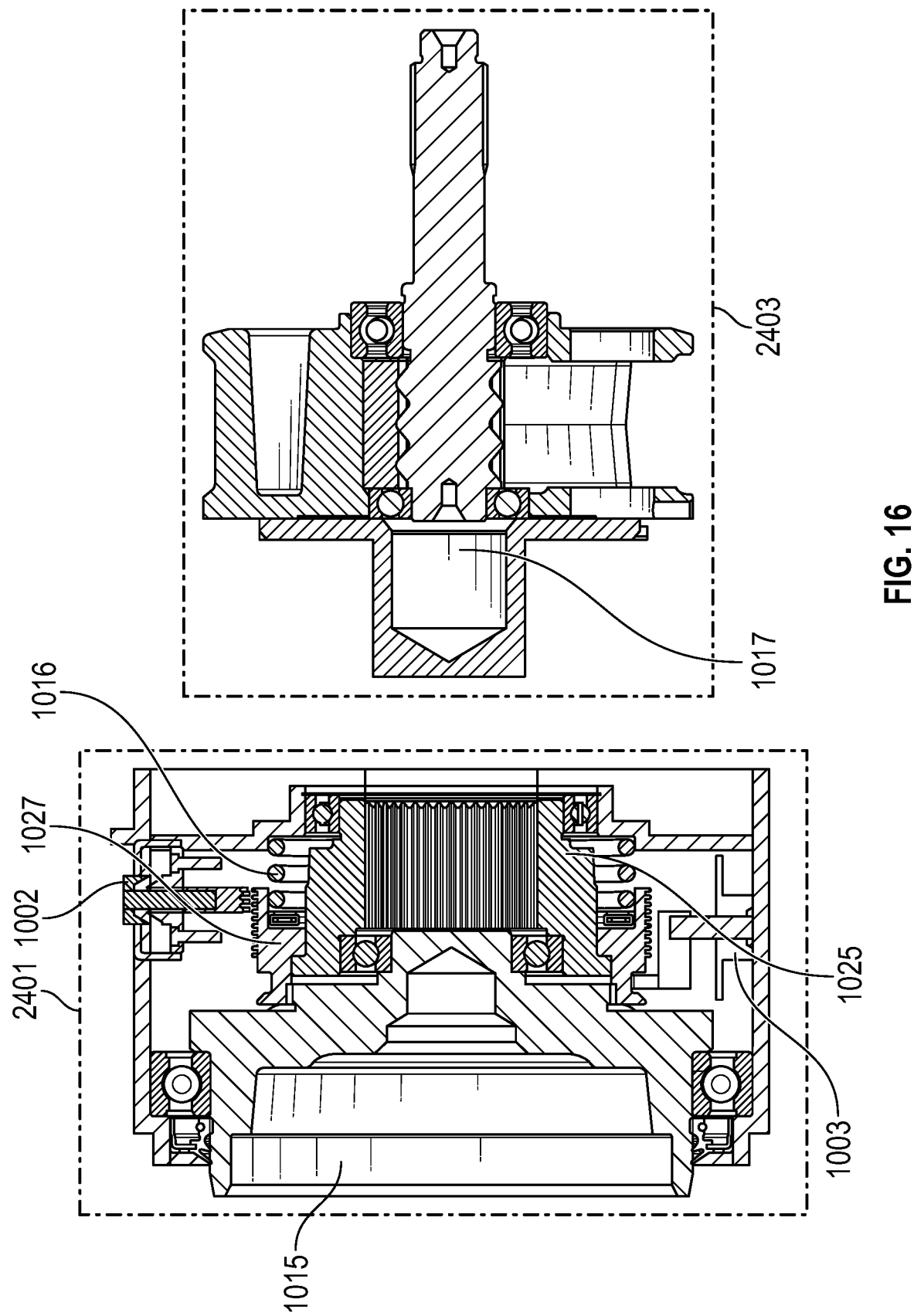
FIG. 16 is a schematic plan view of an axle disconnect assembly of the fourth embodiment showing a packaging structure of a first sub-assembly connecting to a second sub-assembly, in accordance with the teachings of this disclosure.

FIG. 16 is a schematic plan view of an axle disconnect assembly of the fourth embodiment showing a packaging structure of a first sub-assembly and a second sub-assembly, in accordance with the teachings of this disclosure.

The first sub-assembly 2401 includes, but is not limited to, the solenoid 1002, the solenoid 1003, the locker arm 1006, the output shaft 1015, the intermediate shaft 1025, the shift collar 1027, output shaft housing 1037, and bearing support 1033. The second sub-assembly 2403 includes, but is not limited to, the input shaft 1017 on the left end of the sub-assembly 2403.

The input shaft 1017 of the second sub-assembly 2403 may be connected to the right end of the intermediate shaft 1025 of the first sub-assembly 2401 in a packaging process to form the axle disconnect assembly 1000. The diameter of the input shaft 1017 of the second sub-assembly 2403 may be similar to the diameter of the output shaft 1015.

Figure 17:
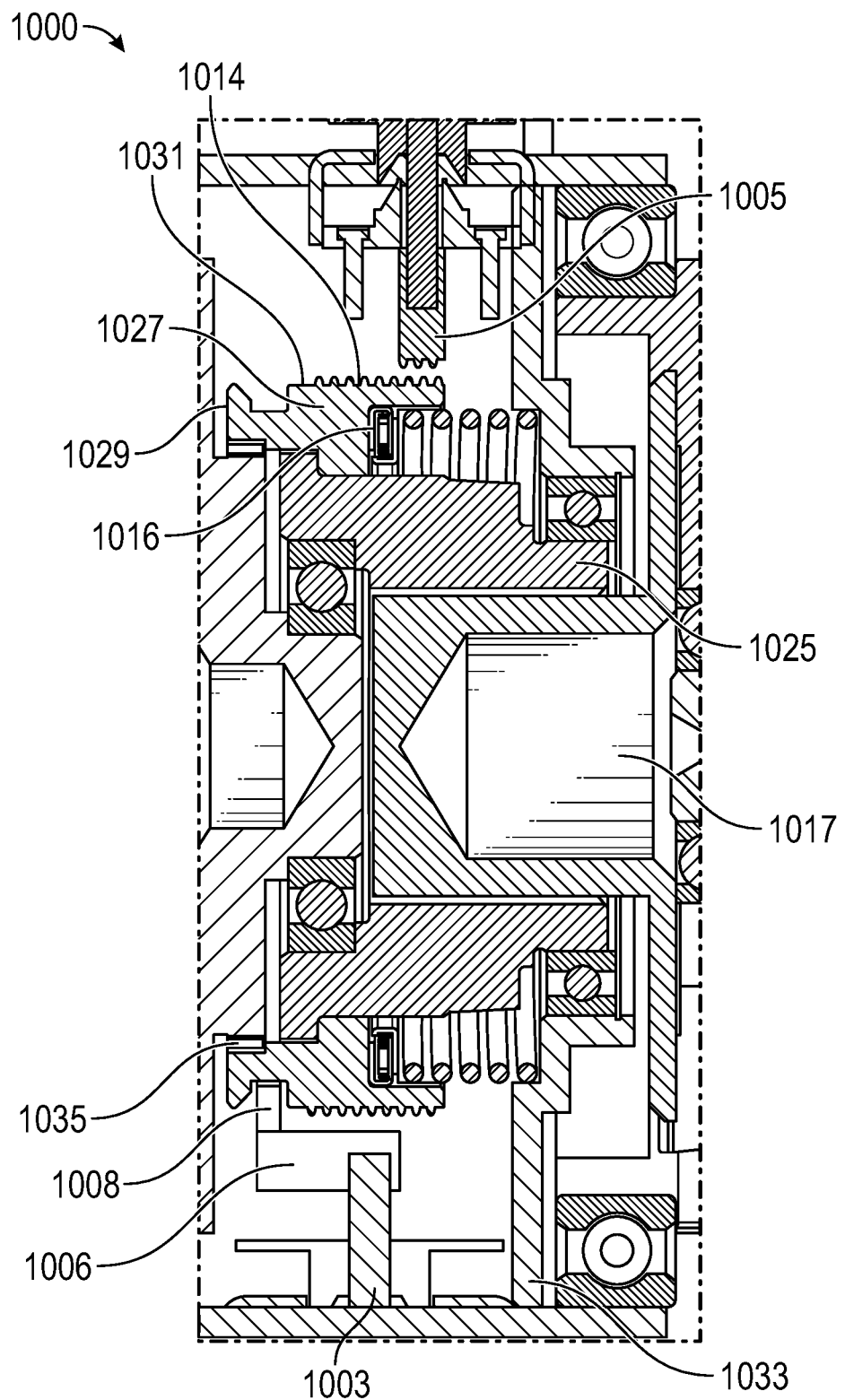
FIG. 17 is a schematic plan view of an axle disconnect assembly of the fourth embodiment shown in a connect mode, in accordance with the teachings of this disclosure.

FIG. 17 is a schematic plan view of an axle disconnect assembly of the fourth embodiment shown in a connect mode, in accordance with the teachings of this disclosure.

In the connect mode, both solenoids 1002, 1003 are de-energized and internal solenoid springs hold the solenoids 1002, 1003 in position. That is, the solenoid 1002 is normally retracted and the solenoid 1003 is normally extended. In the connect mode of FIG. 17, the threaded tip 1005 is not in mesh with the lead screw 1014. The tip 1008 of locker arm 1006 is in the groove 1031 of shift collar 1027. The spring 1016 biases the shift collar 1027 towards the output shaft 1015. Therefore, the locker arm 1006 and the spring 1017 prevent the shift collar 1027 from moving in the axial direction away from the output shaft 1015. The end 1029 of the shift collar is in mesh with the shift spline 1035 of the output shaft housing 1037. Accordingly, the output shaft 1015 and the input shaft 1017 are connected and rotate together via the shift collar 1027.

Figure 18:
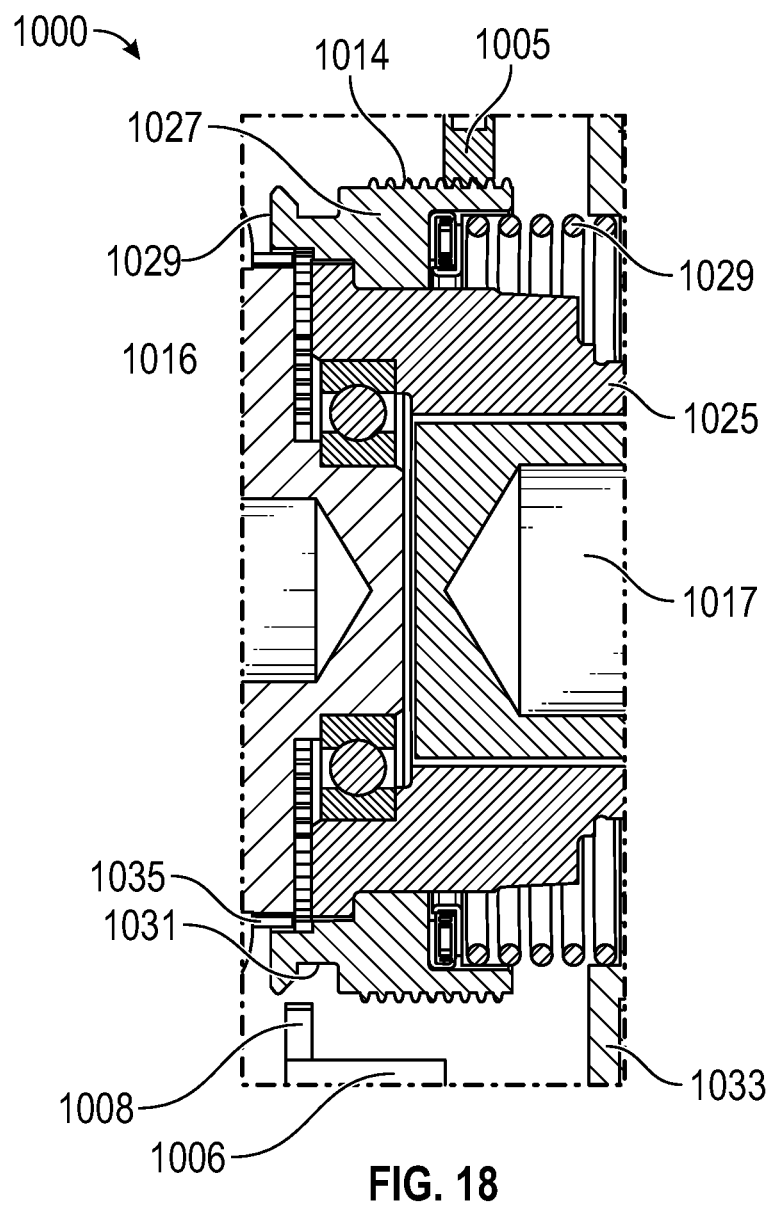
FIG. 18 is a schematic plan view of an axle disconnect assembly of the fourth embodiment shown in a screw winding mode, in accordance with the teachings of this disclosure.

FIG. 18 is a schematic plan view of an axle disconnect assembly of the fourth embodiment shown in a screw winding mode, in accordance with the teachings of this disclosure.

The solenoid 1002 is energized and the plunger of the solenoid 1002 extends. The threaded end 1005 of the solenoid 1002 contacts the lead screw 1014 of shift collar 1027. The second solenoid 1003 is also energized thus retracting the tip 1008 of the locker arm 1006 from the groove 1031 of shift collar 1027. With the threaded end 1005 engaged with the lead screw 1014 and the locker arm 1006 disengaged, the shift collar 1027 is moved toward the input shaft 1017 against the bias force of return spring 1016 due to rotation of the lead screw 1014. As the shift collar 1027 moves, the end 1029 of the shift collar 1027 disengages with the shift spline 1035 of the output shaft housing 1037. Accordingly, the output shaft 1015 and the input shaft 1017 are moved toward the disconnect mode. (FIG. 19).

Figure 19:
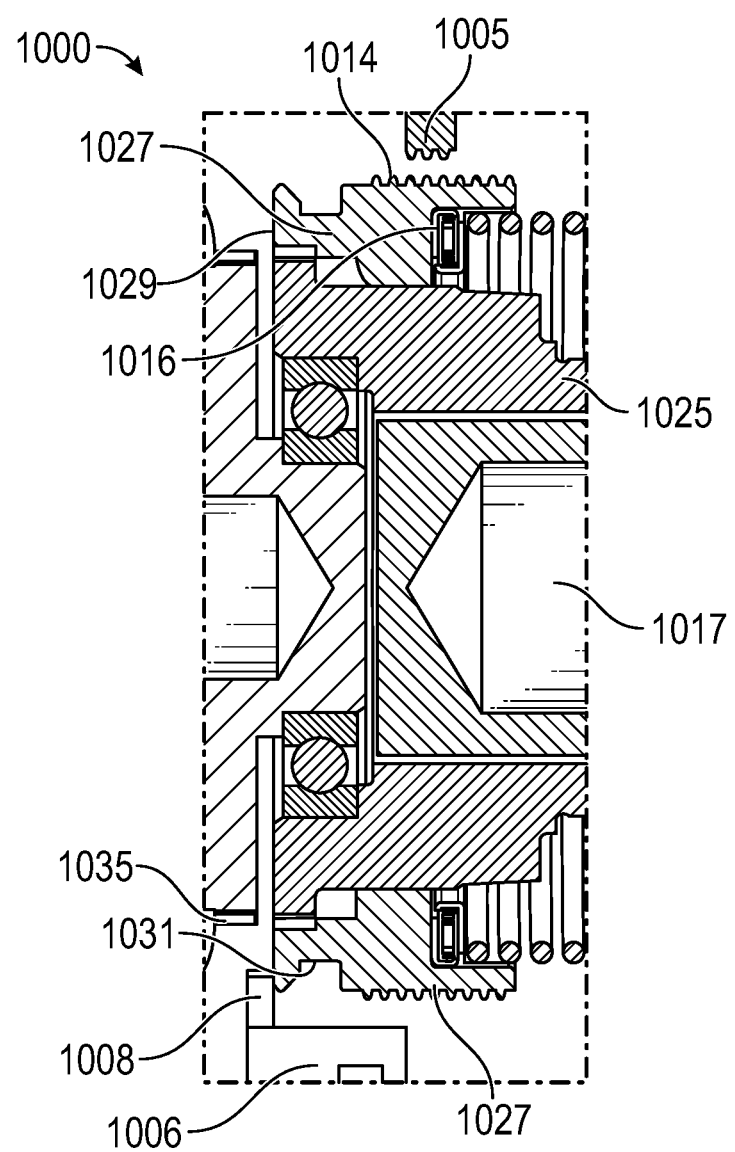
FIG. 19 is a schematic plan view of an axle disconnect assembly of the fourth embodiment shown in a disconnect mode, in accordance with the teachings of this disclosure.

FIG. 19 is a schematic plan view of an axle disconnect assembly of the fourth embodiment shown in the disconnect mode, in accordance with the teachings of this disclosure.

The solenoid 1003 is de-energized at a point when end 1029 of the shift collar 1027 has disengaged the shift spline 1035 and the end 1029 has past the tip 1008 of locker arm 1006. When de-energized, the solenoid 1003 moves upward and the tip 1008 engages the end 1029 as shown in FIG. 19. This engagement prevents the return spring 1016 from moving the shift collar 1027 toward the output shaft 1015 (i.e. towards the connect mode). The solenoid 1002 is also de-energized which disengages the threaded end 1005 from the lead screw 1014.

In the disconnect mode of FIG. 19, the end 1029 of shift collar 1027 is free from the shift spline 1035 of output shaft housing 1037. Therefore, the output shaft 1015 and the intermediate shaft 1025 may rotate independently of each other. Accordingly, the output shaft 1015 and the input shaft 1017 are disconnected.

Figure 20:
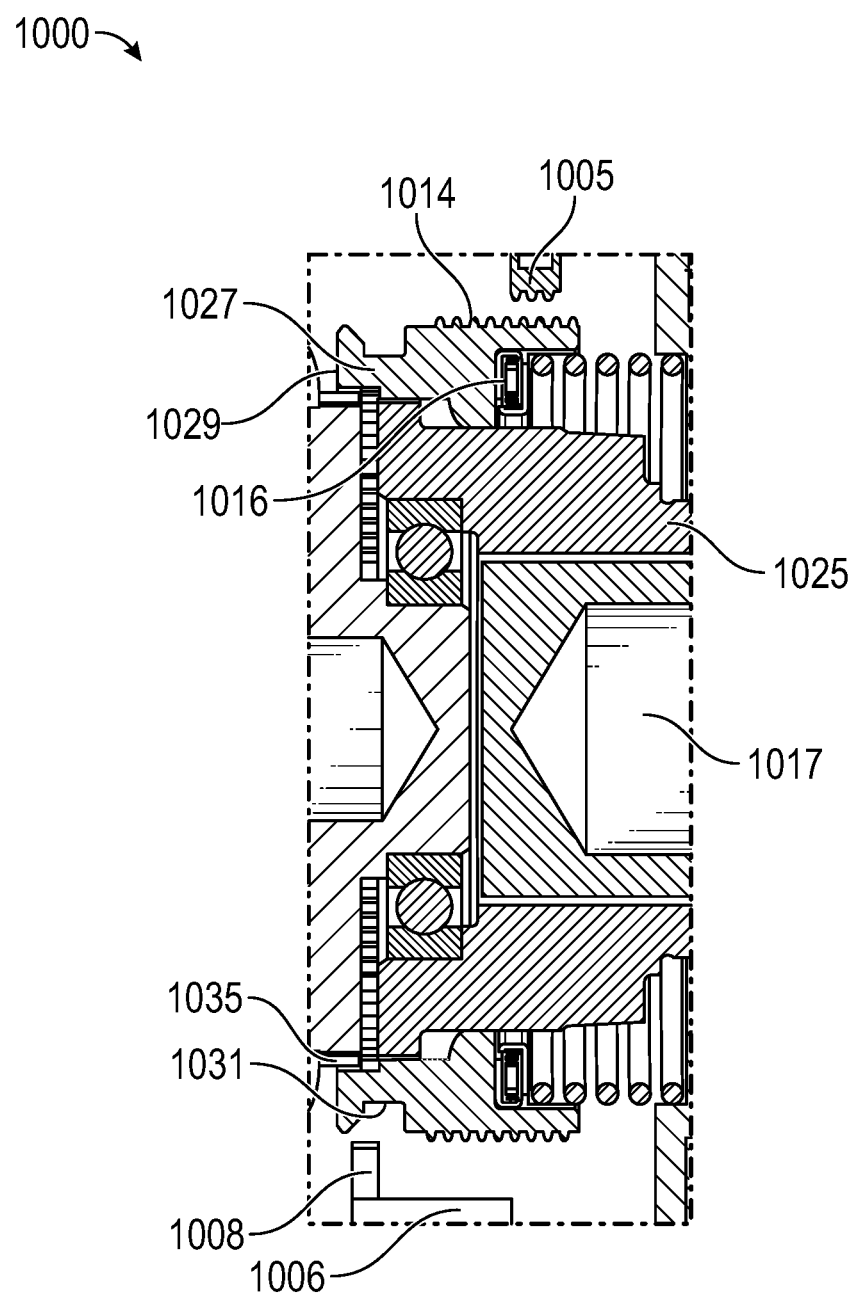
FIG. 20 is a schematic plan view of an axle disconnect assembly of the fourth embodiment shown transitioning to the connect mode, in accordance with the teachings of this disclosure.

FIG. 20 is a schematic plan view of an axle disconnect assembly of the fourth embodiment shown transitioning to the connect mode, in accordance with the teachings of this disclosure.

A transition from the connect mode (FIG. 19) to the disconnect mode (FIG. 17) will be discussed with regard to FIG. 20. The solenoid 1002 is de-energized and therefore the threaded end 1005 is not engaged with the lead screw 1014. The solenoid 1003 is energized and the locker arm 1006 is moved downward and retracted as illustrated in FIG. 20. This movement frees the tip 1008 of the locker arm from the end 1029 of the shift collar 1027. With the shift collar 1027 disconnected from both solenoids 1002 and 1003, the return spring 1016 thrusts the shift collar 1027 toward the output shaft 1015. Then, the end 1029 of the shift collar 1027 engages with the shift spline 1035 of the output shaft housing 1037 due to the bias force of the spring 1016. With the end 1029 and the shift spline 1035 in mesh, the output shaft 1015 and the input shaft 1017 are connected. Next, the solenoid 1003 is de-energized and the locker arm 1006 moves upward to engage the tip 1008 with the groove 1031 of the shift collar 1027. Then, the connect state of FIG. 17 is obtained.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

What is claimed is:

1. An axle disconnect device, the device comprising:
a shift collar slidable in an axial direction of the axle disconnect device, the shift collar switchable between a connect mode and a disconnect mode;
a solenoid including an end;
a locker arm that pivots when pressed by the end of the solenoid, the locker arm including teeth;
a return spring configured to bias a movement of the shift collar towards the connect mode;
a groove on the shift collar configured to receive the locker arm when the shift collar is in the connect mode; and
a lead screw on the shift collar configured to mesh with the teeth of the locker arm to move the shift collar toward the disconnect mode against a bias force of the return spring.

2. The axle disconnect device of claim 1, wherein the end of the solenoid contacts the locker arm to engage the teeth of the locker arm with the lead screw.

3. The axle disconnect device of claim 1, further comprising:
a shift spline that meshes with an end of the shift collar when in the connect mode; and
a tip extending from the locker arm toward the shift collar, the tip contacting the groove of the shift collar in a first position when in the connect mode and contacting the end of the shift collar in a second position when in the disconnect mode.

4. The axle disconnect device of claim 1, wherein the groove is between the lead screw and an end of the shift collar in the axial direction.

5. The axle disconnect device of claim 3, further comprising:
an input shaft fixed to rotate with the shift collar; and
an output shaft fixed to rotate with the shift spline, wherein
the connect mode connects the input shaft and the output shaft, and
the disconnect mode disconnects the input shaft and the output shaft.

6. The axle disconnect device of claim 5, further comprising:
an intermediate shaft splined to the input shaft, wherein
the shift collar is on an outer circumferential side of intermediate shaft and is slidable on the intermediate shaft, and
the return spring is arranged between a support of the intermediate shaft and the shift collar.

7. An axle disconnect device, the device comprising:
a shift collar slidable in an axial direction of the axle disconnect device, the shift collar switchable between a connect mode and a disconnect mode;
a return spring configured to bias a movement of the shift collar towards the connect mode;
a solenoid configured to move a locker arm, the locker arm including a threaded end;
a groove on the shift collar configured to receive the locker arm when the shift collar is in the connect mode; and
a lead screw on the shift collar configured to mesh with the threaded end to move the shift collar toward the disconnect mode against a bias force of the return spring.

* * * * *